(12) United States Patent
Rider et al.

(10) Patent No.: US 9,596,602 B2
(45) Date of Patent: Mar. 14, 2017

(54) ELASTIC COMMUNICATION NETWORK

(71) Applicants: Tomer Rider, Naahryia (IL); Aviv Ron, Nir Moshe (IL); Yair Giwnewer, Haifa (IL); Yevgeny Kiveisha, Bney Aish (IL)

(72) Inventors: Tomer Rider, Naahryia (IL); Aviv Ron, Nir Moshe (IL); Yair Giwnewer, Haifa (IL); Yevgeny Kiveisha, Bney Aish (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,095

(22) PCT Filed: May 21, 2013

(86) PCT No.: PCT/US2013/042067
§ 371 (c)(1),
(2) Date: Dec. 13, 2013

(87) PCT Pub. No.: WO2014/189496
PCT Pub. Date: Nov. 27, 2014

(65) Prior Publication Data
US 2014/0349613 A1 Nov. 27, 2014

(51) Int. Cl.
*H04L 29/06* (2006.01)
*H04W 12/08* (2009.01)
*H04W 88/04* (2009.01)

(52) U.S. Cl.
CPC ......... *H04W 12/08* (2013.01); *H04L 63/0272* (2013.01); *H04W 88/04* (2013.01)

(58) Field of Classification Search
CPC .... H04L 63/0272; H04W 12/08; H04W 88/04

USPC ......................................................... 455/411
See application file for complete search history.

(56) References Cited

U.S. PATENT DOCUMENTS

| 7,953,070 | B1* | 5/2011 | Agarwal | H04M 7/0078 370/352 |
|---|---|---|---|---|
| 2002/0032853 | A1* | 3/2002 | Preston | H04L 63/061 713/151 |
| 2003/0073406 | A1* | 4/2003 | Benjamin | G08G 1/0962 455/41.1 |
| 2010/0082481 | A1* | 4/2010 | Lin et al. | 705/41 |
| 2011/0276802 | A1* | 11/2011 | Roberts et al. | 713/171 |
| 2012/0216266 | A1 | 8/2012 | Wang et al. | |
| 2012/0311320 | A1* | 12/2012 | Brown et al. | 713/155 |

(Continued)

FOREIGN PATENT DOCUMENTS

KR 10-2011-0128251 A 11/2011
WO WO 2012/123400 A1 * 9/2012

OTHER PUBLICATIONS

International Search Report and Written Opinion received for PCT Patent Application No. PCT/US2013/042067, mailed on Jun. 28, 2013, 9 pages.

*Primary Examiner* — Qun Shen
(74) *Attorney, Agent, or Firm* — Sutherland Asbill & Brennan LLP

(57) ABSTRACT

Systems, devices, and techniques are provided for a communication network in which a wireless communication service can be furnished or otherwise extended to a mobile computing device from one or more other mobile computing devices.

25 Claims, 9 Drawing Sheets

(56) References Cited

U.S. PATENT DOCUMENTS

2013/0084914 A1* 4/2013 Wu .................... H04W 76/023
　　　　　　　　　　　　　　　　　　　　　455/525
2013/0110920 A1　5/2013 Broustis et al.
2014/0101049 A1* 4/2014 Fernandes ............. G06Q 20/02
　　　　　　　　　　　　　　　　　　　　　705/44

* cited by examiner

ELASTIC COMMUNICATION NETWORK

BACKGROUND

The majority of end-users of electronic equipment with telecommunication capabilities typically are connected to a communication network that can permit the exchange of digital content with other equipment. Such an exchange has become an integral part of the professional and/or personal activities of the end-users that consume such content. Thus, connectivity to networked sources of information, such as the Internet, has become a nearly ubiquitous necessity in the daily endeavors of most end-users. In response to such reliance on networked information, communication carriers have strived to expand telecommunication infrastructures and develop telecommunication protocols directed to maintaining fast and reliable access to digital content via communication networks. As a result, public Wi-Fi networks have been deployed in several public spaces. Yet, Wi-Fi networks typically have a footprint predominantly distributed around commercial spaces with public access, such as airports, restaurants, coffee shops, and the like, or historically public spaces, such as libraries, city parks and recreation centers, and the like. In view of such a deployment footprint, most end-users of network digital content tend to seek access to free-of-charge Wi-Fi network(s), with the ensuing nearly constant search for a commercial facility (e.g., a Starbucks coffee shop or a McDonald's restaurant) or other type of confined space with Wi-Fi service coverage. Behaviors associated with free-of-charge access to connectivity to a communication network with wide-area access can be disruptive operationally and/or commercially to the end-user that seeks such access and/or to an administrator (e.g., an owner or lessee) of a confined space in which the communication network is deployed.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
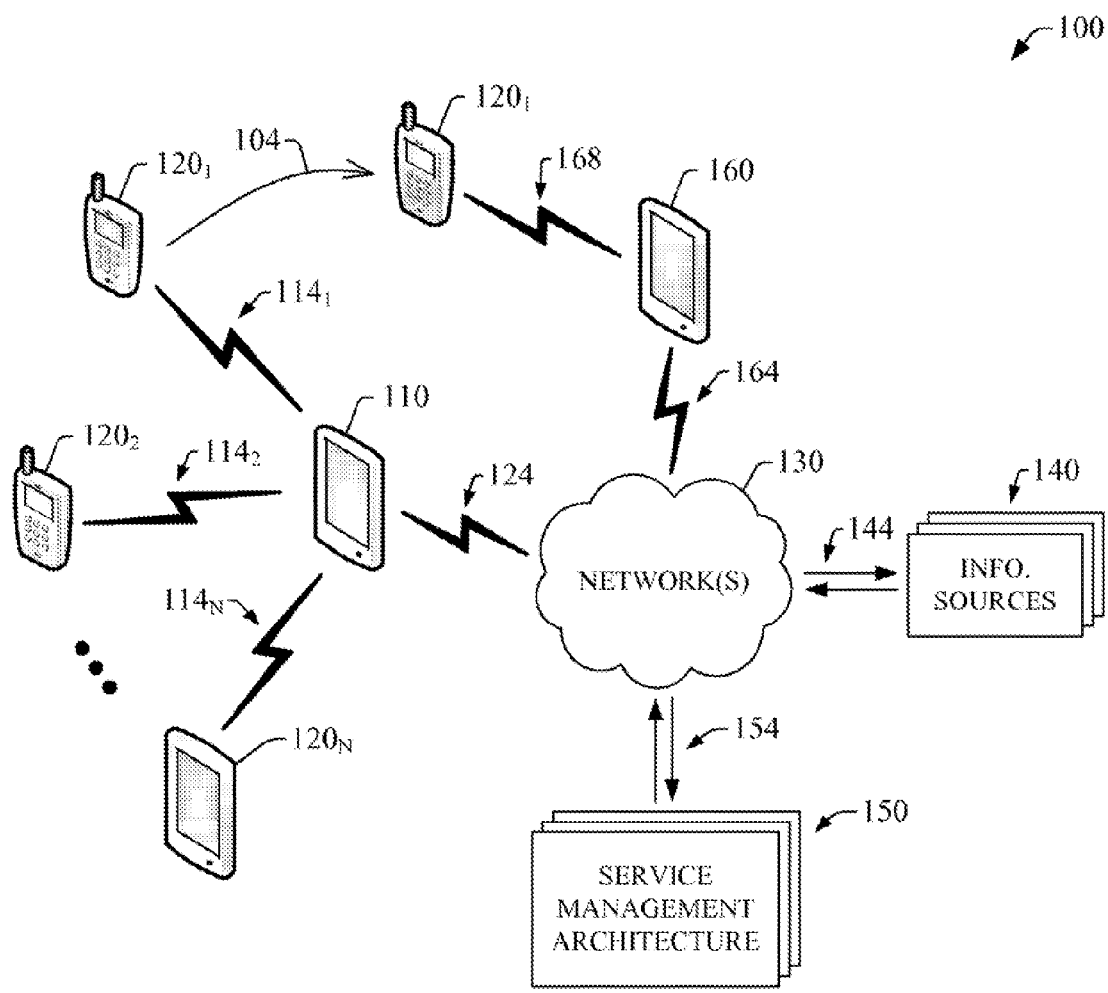
FIG. 1 illustrates an example operational environment in accordance with one or more aspects of the disclosure.

The present disclosure recognizes and addresses, in at least certain aspects, the lack of readily accessible, nearly ubiquitous connectivity to network service(s) and/or network resources. In certain embodiments, the disclosure provides a communication network in which a communication service can be provided by a mobile computing device to one or more other mobile computing devices. The communication network can be a mobile communication network, and the communication service can provide wireless communication (e.g., wireless transmission and/or wireless reception) of information to and/or from a mobile computing device. In the present disclosure, a mobile computing device that can provide the communication service can be referred to as a "host device," and a mobile computing device that utilizes or otherwise consumes the communication service can be referred to as a "peer device." A host device and a peer device may be referred to generically as a service provider and a consumer, respectively. In addition, the communication service for a peer device can be maintained (e.g., handed off) across various host devices. Accordingly, in one aspect, the communication network can be referred to as an "elastic mobile network," and the communication service, which provides wireless connectivity to a mobile computing device, can be referred to as a "cellular-sharing connectivity service."

As described in greater detail below, the disclosure provides various embodiments of the elastic mobile network. Such embodiments include systems, computing devices, apparatuses, techniques, and/or computer program products that can provide a communication service that can permit access to networked information (such as Internet access) over a mobile communication network in accordance with a transactional model that can regulate access to the communication service via a host device. The transactional model can include a payment structure associated with predetermined payments directed to access the communication service; a service subsidy structure or rule(s) for waiver of payment for service; and/or one or more conditions for open service (e.g., free-of-charge access). Such payments can be monetary payments or non-monetary payments (e.g., service points or units, reward units of a loyalty program, or the like), in exchange for access to the communication service. As an illustration, the payment structure can establish pricing for access to the communication service, where the pricing can include, for example, a price point per unit of time, a price point for a period of service, a price point for the volume of information provided during the service, a combination thereof, or the like. Information (e.g., data, metadata, and/or signaling) directed to and/or originated at a peer device can be accessed via the host device through a secure (e.g., tamper resistant) communication pathway within the host device. In addition, information directed to and/or originated at the host device can be routed or otherwise communicated via another secure communication pathway within the host device. The communication service can operate globally and can permit global sharing of network resources in most any communication network (such as 3rd Generation Partnership Project (3GPP) mobile telecommunication networks, which also may be referred to as 3G mobile networks).

In certain embodiments, the communication service described herein can be provided via a group of host components integrated into the host device and/or one or more remote network components distributed in a network and functionally coupled (e.g., communicatively coupled) to the host device. In one example implementation, the group of host components can include at least one software component and at least one firmware component. The firmware component(s) can provide at least two secure communication pathways that permit routing or otherwise directing information to and from the peer device and/or to or from the host device. In addition, the one or more network components can manage various aspects of the communication service, such as administration of host devices, peer devices, and/or third-party agents. At least one of the one or more network components also can manage interaction or integration of the communication service with third-party agents (such as advertisers or an advertiser platform, merchants or a merchant platform, nodes of a social network, and the like).

Embodiments of the disclosure can provide various advantages over conventional wireless access points or "hot spots." As an example advantage, certain embodiments can mitigate exposure of a host device to security threats by communicatively insulating, via specific secure firmware communication pathways, certain functional elements of the host device from information directed to a peer device. In addition, a peer device can be assured to have a secure and/or private connection to one or more network resources without the host device being operable to sniff a communication via such a connection and/or perform man-in-the-middle attacks by using an altered, malicious version of host functional element(s) (such as a malicious operating system (OS)). As another example advantage, one or more embodiments can permit nearly ubiquitous access to networked information substantially without geographical constraints.

With reference to the drawings, FIG. 1 presents an example operational environment 100 in accordance with one or more aspects of the disclosure. In such an environment, a mobile computing device 110 (which herein may also be referred to as "mobile device 110") can be functionally coupled (e.g., communicatively coupled) with one or more networks 130 via one or more wireless links 124. In one aspect, the link(s) 124 can include a downstream link (DL) and/or an upstream link (UL), and can be embodied in wired link(s), wireless link(s) (including terrestrial air interfaces and/or deep-space link(s)), or a combination thereof. The network(s) 130 can comprise wireless networks and/or wireline networks, having different spatial scope or network footprint. e.g., personal area network(s), home area network(s), local area network(s) (LAN(s)), metropolitan area network(s) (MAN(s)), wide area network(s) (WAN(s)), deep-space network(s) (such as satellite network(s)), a combination thereof or the like. It should be appreciated that the network(s) 130 can be deployed at specific location(s) and can have specific coverage scope that can be commensurate with the spatial scope. In one aspect, the one or more networks 130 can include communication network(s) that can provide a communication/network service (e.g., voice communication and/or information communication) to the mobile device 110. As an illustration, the network(s) 130 can include a WAN, such as the Internet, that can permit the mobile device 110 to access (e.g., receive, decode, receive and decode, or the like) web-based content and/or other web-based voice information. For instance, the web-based content can include media assets (e.g., still images, moving images, audio segments, video segments, combinations thereof, or the like), whereas the other web-based information can include data streams associated with voice over Internet protocol (VoIP) communication sessions.

The mobile device 110 can communicate information (e.g., deliver information, receive information, or exchange information) wirelessly with at least one of the network(s) 130 in accordance with one or more radio telecommunication protocols associated with respective one or more radio technologies. In one aspect, the mobile device 110 can communicate with a network node, such as a base station or an access point, in accordance with modulation and encoding techniques associated with at least one of such radio telecommunication protocol(s). The one or more radio technologies can include, for example, one or more of 3rd Generation Partnership Project (3GPP) Universal Mobile Telecommunication System (UMTS); 3GPP Long Term Evolution (LTE); LTE Advanced (LTE-A); Institute of Electrical and Electronics Engineers (IEEE) 802.11 standards (Wi-Fi); IEEE 802.16 standards (or Worldwide Interoperability for Microwave Access (WiMAX); radio technologies and related protocols for ad hoc networks, such as Bluetooth ZigBee; or the like).

In addition, the mobile device 110 can communicate wirelessly with one or more mobile computing devices $120_1$-$120_N$, where N is a natural number satisfying N>1, via respective link(s) $114_1$-$114_N$. In one aspect, the mobile device 110 can communicate information (e.g., deliver information, receive information, or exchange information) wirelessly with at least one of such device(s) in accordance with one or more radio telecommunication protocols associated with respective one or more radio technologies. In one aspect, the mobile device 110 can communicate with one of the mobile computing devices $120_1$-$120_N$ in accordance with modulation and encoding techniques associated with at least one of such radio telecommunication protocol(s). The one or more radio technologies can include, for example, one or more of 3GPP UMTS; 3GPP LTE; 3GPP LTE Advanced (LTE-A); IEEE 802.11 standards (or Wi-Fi); IEEE 802.16 standards (or WiMAX); radio technologies and related protocols for ad hoc networks, such as Bluetooth ZigBee; or the like).

In certain embodiments, the mobile device 110 can communicate wirelessly in accordance with two or more radio technologies and associated radio telecommunication protocols (or radio protocols). Accordingly, in one example scenario, the mobile device 110 can communicate with at least one of the network(s) 130 via a first radio technology and related first radio telecommunication protocol(s), and can communicate with at least one of the mobile computing devices $120_1$-$120_N$ via a second radio technology and related second radio telecommunication protocol(s). For instance, the mobile device 110 can communicate with one of the network(s) 130 via 3GPP LTE and with one of the mobile computing devices $120_1$-$120_N$ via Wi-Fi.

As illustrated, the mobile computing devices $120_1$-$120_N$ (which herein also can be referred to as mobile devices $120_1$-$120_N$) are not communicatively coupled with the network(s) 130. Accordingly, such mobile devices may not have access to information supplied via the network(s) 130. In one aspect, the mobile device 110 can permit access to such information for at least one (e.g., one, two, more than two, or each) of the mobile devices $120_1$-$120_N$. To at least such an end, in one aspect, the mobile device 110 can establish communication with the at least one mobile device (e.g., mobile device $120_2$), and can provide a communication service to the at least one mobile device. The communication service can permit wireless transmission of information to the at least one of the mobile devices $120_1$-$120_N$. In addition or in the alternative, the communication service can permit wireless reception of information from the at least one of the mobile devices $120_1$-$120_N$. Accordingly, as described herein, such a communication service can be referred to as a cellular-sharing connectivity service. As described herein, the communication service can be furnished to the at least one of the mobile devices $120_1$-$120_N$ in accordance with a transactional model that may be specific or otherwise customized to the mobile device 110 or the mobile device that is furnished the communication service. Within the cellular-sharing connectivity service, the mobile device 110 can transmit at least a portion of the information that is received from the at least one of the mobile devices $120_1$-$120_N$ to a network element (e.g., an application server or a network node) of at least one of the network(s) 130 and/or to a destination computing device (not shown in FIG. 1). In addition, the mobile device 110 can receive at least a portion of the information that is transmitted to the at least one of the mobile devices $120_1$-$120_N$ via one or more of the network(s) 130.

In certain example scenarios, at least a portion of the information that is communicated wirelessly within the communication service can be generated or otherwise originated at an information source of the group of one of one or more information sources 140. The information source(s) 140 comprise one or more of an application server, a content server, a repository or a database thereof, or the like. In addition, such information can be communicated, at least in part, via at least one of network(s) 130. To at least such an end, one or more of the information source(s) 140 can be functionally coupled to at least one of the network(s) 130 via data and signaling pipe(s) 144 which can comprise wireline link(s) and/or wireless link(s) and several network elements (such as routers or switches, concentrators, servers, and the like) that may form one or more reference links.

As illustrated in the example operational environment 100, a service management architecture 150 can be functionally coupled (e.g., communicatively coupled) to the mobile device 110, and can provide one or more features of the cellular-sharing connectivity service described herein. One or more network elements (e.g., component(s), unit(s), platform(s), or the like) of the service management architecture 150 can be functionally coupled to one or more of the network(s) 130 via data and signaling pipe(s) 154. It should be appreciated that, in one aspect, such feature(s) can be provided as network-based feature(s) and can be configured as a cloud service. In one example scenario, the service management architecture 150 can regulate access to the communication service provided by the mobile device 110. For instance, a computing device remote to the mobile device 110 that can regulate access to the communication service provided by the mobile device 110 can embody or can constitute a network element (or network node) of the service management architecture 150.

In addition, at least one network element of the service management architecture 150 can permit handoff of a mobile computing device provided with cellular-sharing connectivity service by the mobile device 110 to another mobile computing device that can provide such a service. For instance, in one handoff scenario, the mobile device $120_1$ can be provided with the cellular-sharing connectivity service via the mobile device 110 and can relocate away from such a host device. In view of the relocation, which is represented with arrow 104, the mobile device 110 can be situated close to a mobile computing device 160 and functionally coupled thereto via link(s) 168. The mobile computing device 160 can be functionally coupled to the network(s) 130 via link(s) 164, and can provide cellular-sharing connectivity service to the mobile computing device $120_1$. The at least one network element can determine that the mobile computing device 160 can provide such a service and, in response, can perform handover of the mobile computing device $120_1$ from the mobile computing device 110 to the mobile computing device 160.

As described herein, a mobile computing device that provides the cellular-sharing connectivity service described herein can be referred to as a host device or, more generically, as a service provider, whereas a mobile computing device that is provided with the cellular-sharing connectivity service can be referred to as a peer device or, more generically, as a consumer. It should be appreciated that a peer device need not be directly provisioned or activated by one or more of the network(s) 130 because the cellular-sharing connectivity service is provided by the host device that is directly provisioned and activated by at least one of the network(s) 130. In addition, the peer device need not be germane to or otherwise associated with a geographical region (such as a country) in which the network(s) 130 are deployed and operate in order to access information or a network resource associated with the network(s) 130. The peer device can communicate directly with the host device via a radio protocol (e.g., Wi-Fi) that permits ad hoc access to the host device. Accordingly, in one aspect, the cellular-sharing connectivity service can be provided worldwide, and the peer device can access network resources without roaming while operating outside the device's day-to-day operational environment. For instance, an end-user associated with a peer device can access the Internet and/or other networks while traveling to a foreign country.

Figure 2:
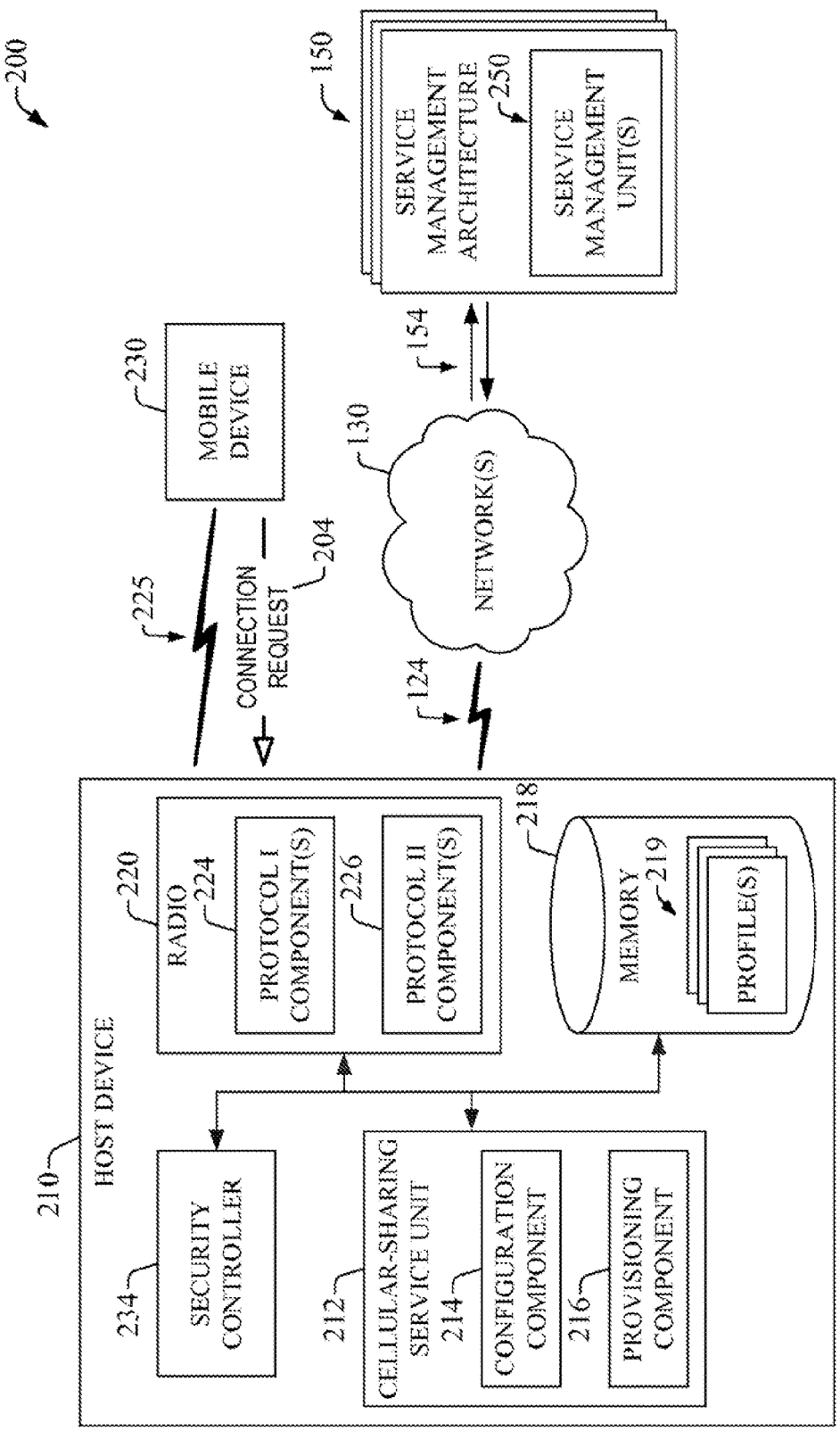
FIG. 2 illustrates another example operational environment in accordance with one or more aspects of the disclosure.

FIG. 2 illustrates another example operational environment 200 in which a host device 210 provides cellular-sharing connectivity service to a peer device in accordance with one or more aspects of the disclosure. The host device 210 can be configured to provide the cellular-sharing connectivity service, which can be referred to as being configured as a service provider (or, more informally, as a "portable hotspot"). In the illustrated embodiment, a cellular-sharing connectivity service unit 212 (also referred to as mobile service unit 212) can configure, via a configuration component 214, the host device 210 to operate as a service provider. In one aspect of service configuration, the configuration component 214 can establish or otherwise configure one or more price points for payment in exchange for access to the cellular-sharing connectivity service. The one or more price points can form a pricing structure comprising at least one tier of pricing, and can be referred to as service pricing. In another aspect of service configuration, the configuration component 214 can establish or otherwise configure a group of peer mobile computing devices permitted to access the communication service. Such a group can be referred to as a set of permissible peer devices. It should be appreciated that the configuration component 214 also can establish or otherwise configure a group of peer mobile computing devices that are forbidden from being provided the cellular-sharing connectivity service. In one implementation, the configuration component 214 can utilize one or more device identifiers in order to establish a group of permissible peer devices and/or a group of impermissible peer devices. In yet another aspect of service configuration, the configuration component 214 can determine a number of peer mobile computing devices included in the group of permissible peer devices and/or an identity of at least one of the group of peer mobile computing devices. The identity of a peer mobile computing device can comprise a media access control (MAC) address or any other unique logical address. In still another aspect of service configuration, the configuration component 214 can establish an amount (e.g., a quota) of information that can be conveyed to a permissible peer device (e.g., mobile device 230) and/or that can be received from the permissible peer device and conveyed to a network element of the network(s) 130.

The configuration component 214 can convey information indicative or otherwise representative of a service configuration . . . e.g., set of permissible peer devices, service pricing, scope of service, a combination thereof, or the like . . . to a unit of the service management unit(s) 250. In addition or in the alternative, the configuration component 214 can retain at least a portion of the service configuration in one or more memory elements 219 (which can be referred to as profile(s) 219) within a memory device 218 (also referred to as memory 218). It should be appreciated that the host device 210 can establish more than one service configuration. In certain embodiments, an instance of the service configuration can be retained in one of the profile(s) 219 for a finite period.

In response to being configured as a service provider, the host device 210 can transmit (e.g., broadcast, multicast, or unicast) service information indicative of the cellular-sharing connectivity service provided by the host device 210. To at least such an end, the cellular-sharing service unit 212 can utilize or otherwise leverage a radio unit 220 (also referred to as radio 220) to communicate the service information. In one embodiment, the radio unit 220 can include one or more antennas and a communication processing unit comprising component for processing wireless signals. At least a portion of such components and at least some of the antenna(s) can be grouped into a first set of one or more components 224 (also referred to as depicted as "protocol I component(s)") that can permit wireless communication according to a first radio protocol, and a second set of one or more components 226 (also referred to as depicted as "protocol II component(s)") that can permit wireless communication according to a second radio protocol. In one aspect, the cellular-sharing service unit 212 can generate pilot information (e.g., pilot data, pilot metadata, and/or signaling) indicative of availability of availability of the cellular-sharing connectivity service, and can direct the radio unit 220 to transmit at least a portion of the pilot information. At least the portion of the pilot information can be transmitted in accordance with the first radio protocol, which can be referred to as "radio protocol I." In one aspect, the radio protocol I can be a packet-switching protocol configured to convey data over a specific air interface. In one example scenario, the radio protocol I can be Wi-Fi protocol. In one embodiment, the radio 220 can include one or more antennas in addition to at least one component configured or otherwise suitable to process wireless signals, such as radiofrequency (RF) signals, microwave signals, infrared signals, visible electromagnetic signals, or the like A mobile device 230 can be functionally coupled (e.g., communicatively coupled) to the host device 210 via link(s) 225. In one aspect, the link(s) 225 can include a DL and/or an UL, and can be embodied in wired link(s), wireless link(s) (including terrestrial air interfaces and/or deep-space link(s)), or a combination thereof. The mobile device 230 also may be referred to and illustrated as "peer device 230." The mobile device 230 can receive at least the portion of the pilot information and, in response, can transmit a connection request 204 to the host device 210. The connection request 204 can be embodied in or can comprise an information object (e.g., a data structure) formatted according to the first radio protocol. The connection request 204 can permit petitioning for access to the cellular-sharing connectivity service provided by the host device 210. In one aspect, the connection request 204 can include information associated with the transactional model that regulates access to the cellular-sharing connectivity service. For example, the connection request 204 can include device identification (ID) information indicative of a device identifier that can be unique. The device identifier can include an international mobile subscriber identity (IMSI); a temporary IMSI (TIMSI); an international mobile equipment identifier (IMET); a mobile directory number (MDN); a mobile identification number (MIN); a Telecommunications Industry Association (TIA) electronic serial number (ESN); a multi-bit identification number like the mobile equipment identifier (MEID); a mobile subscriber ISDN (Integrated Services Digital Network) number (MSISDN); an IP (internet protocol) multimedia private identity (IMPI); an IP multimedia public identity (IMPU); a MAC address; a combination of the foregoing; or the like. For another example, the connection request 204 can include payment information indicative of a payment in exchange for access to the cellular-sharing connectivity service. For yet another example, the connection request 204 can comprise a combination of the device ID information and the payment information.

The host device 210 can receive (e.g., tune to, decode, demultiplex, demodulate, or a combination thereof) the connection request 204 from the mobile device 230. In one aspect, the host device 210 can receive information indicative of a payment in exchange for access to the cellular-sharing connectivity service from the mobile device 230. In the illustrated embodiment, the radio unit 220, via at least one of the radio protocol I components 224, can receive the connection request 204 and can communicate it to the mobile service unit 212. A provisioning component 216 can analyze or otherwise process the connection request 204 and, within the analysis or processing, can determine if the connection request 204 is valid. In one implementation, the provisioning component 216 can analyze or otherwise process the connection request 204 based on the transactional model that regulates service access. As described herein, the transactional model can include one or more access rules that the provisioning component 216 can apply to the connection request 204 in order to ascertain the validity or invalidity of the connection request 204. In other implementations, the provisioning component 216 can convey the communication request 204 to a remote computing device that can regulate access to the cellular-sharing connectivity service provided by the host device 210. The remote computing device can embody or can constitute at least one of the service management units 250. In certain embodiments, the transaction model or information indicative thereof can be retained or otherwise recorded on a memory device integrated into or functionally coupled to the remote computing device.

In a scenario in which the mobile service unit 212 ascertains that the connection request 204 is valid (e.g., the mobile device 230 is a device authorized to access the cellular-sharing connectivity service and/or has provided adequate payment in exchange of service), the mobile service unit 212 can provision the cellular-sharing connectivity service to the mobile device 230. In addition or in the alternative to the provisioning, the cellular-sharing connectivity service can be activated for the mobile device 230. In one aspect, the provisioning component 216 can transmit provisioning information indicative or otherwise representative of the mobile device 230, and initiation of service to a remote computing device can activate the cellular-sharing connectivity service. In another aspect, the provisioning component 216 can transmit, to the remote computing device, provisioning information indicative of an identity of the mobile device 230 and/or a payment mode that is applicable to mobile device 230 in order in order for such device to access the cellular-sharing connectivity service. As described herein, the payment mode can comprise one or more of direct payment mode or third-party payment mode. In one aspect, within the direct payment mode, the mobile device 230 can convey a payment in exchange for the cellular-sharing connectivity service, whereas in third-party payment, a third-party agent (such as an advertiser) can provide a payment in exchange for the cellular-sharing connectivity service. The remote computing device can embody or constitute one of the service management unit(s) 250.

In one implementation, the provisioning information described herein can be transmitted via the radio unit 220 to a network of the network(s) 130, which can route such information to the proper unit of the service management unit(s) 250. In one embodiment, one or more components 226 associated with a second radio protocol (referred to as "radio protocol II") can transmit the provisioning information. The second radio protocol can be different from the first radio protocol. In one example scenario, the radio protocol II can be 3GPP LTE protocol. As illustrated, the one or more components 226 can be referred to as protocol II component(s) 226. Upon or after service activation, the mobile device 230 can be identified logically within the service management architecture 150 and/or the host device 210 as a peer device 230.

In response to the provisioning (e.g., upon or after the provisioning) of the cellular-sharing connectivity service to the mobile device 230, information can be received wirelessly from the mobile device 230 and/or information can be transmitted wirelessly to the mobile device 230. In addition, the mobile device 230 can be referred to as peer device 230 and at least a portion of such information can be referred to as "peer information." In one scenario, in order to receive information wirelessly from the peer device 230 and/or transmit peer information wirelessly to the peer device 230, a communication session can be initiated between the peer device 230 and a remote network element (e.g., a computing device; not shown in FIG. 2) within a network of the network(s) 130. Such a communication session can permit the host device 210 to route peer information (data, metadata, and/or signaling) from the peer device 230 to the remote computing device (e.g., a computing device) of the network(s) 130, and/or to route peer information from the remote network element to the peer device 230. In the illustrated embodiment, the configuration component 214 can initiate such a communication session. In one example implementation, within initiation of the communication session, the configuration component 214 can establish a packet-switching (PS) protocol tunnel between the peer device 230 and the remote network element. As an example, the PS protocol tunnel can be embodied in or can comprise an IP tunnel, such as a general packet radio service (GPRS) tunnel in accordance with GPRS tunneling protocol (GTP). In one aspect of administration of the cellular-sharing connectivity service, the configuration component 214 can transmit session information indicative of the communication session to one of the service management unit(s) 250 or a computing device thereof or functionally coupled thereto. At least a portion of such session information can permit service accounting, generation of advertisement content, or the like.

Wireless communication of peer information between the host device 210 and the peer device 230, and the host device 210 and a network element of the network(s) 130 can be implemented securely via a security control unit 234 (also referred to and illustrated as security controller 234). The security controller 234 can avoid, substantially or strictly, propagation of peer information to functional elements, such as component(s) and/or platform(s), of the host device 210 that permit operation thereof. To at least such an end, the security controller 234 can be embodied in or can comprise firmware and can transport information via secure firmware communication pathways specific to the information that is transported. In certain embodiments, the security controller 234 can comprise one or more processing units having processing circuitry or hardware, and one or more memory devices which can comprise storage hardware having logic circuitry. At least a portion of the logic circuitry can be accessed by at least one of the processing units. According, in one aspect, the logic circuitry can be referred to as processor-accessible storage device. For example, in one embodiment, the security controller 234 can be embodied in or can comprise a tamper resistant processor having one or more hardware security components. The security controller 234 can determine an intended recipient of certain information (e.g., data, metadata, and/or signaling) and based on the intended recipient, the security controller 234 can route the information via a particular secure firmware communication pathway. In one aspect, information intended for the host device 210, which can be referred to as "host information," can be transported via a secure firmware communication pathway that is different from the secure firmware communication pathway that transports peer information. Such a distinction between secure firmware communication pathways can permit mitigation of exposure of the host device 210 to information directed to a peer device and to security threats that may be associated with such information. It should be readily appreciated that the security controller 234 can mitigate or avoid proliferation of malware into the host device 210. It should be appreciated that in certain embodiments, the security controller 234 and the radio 220 can be integrated into a single functional element, such as a single unit.

Figure 3A:
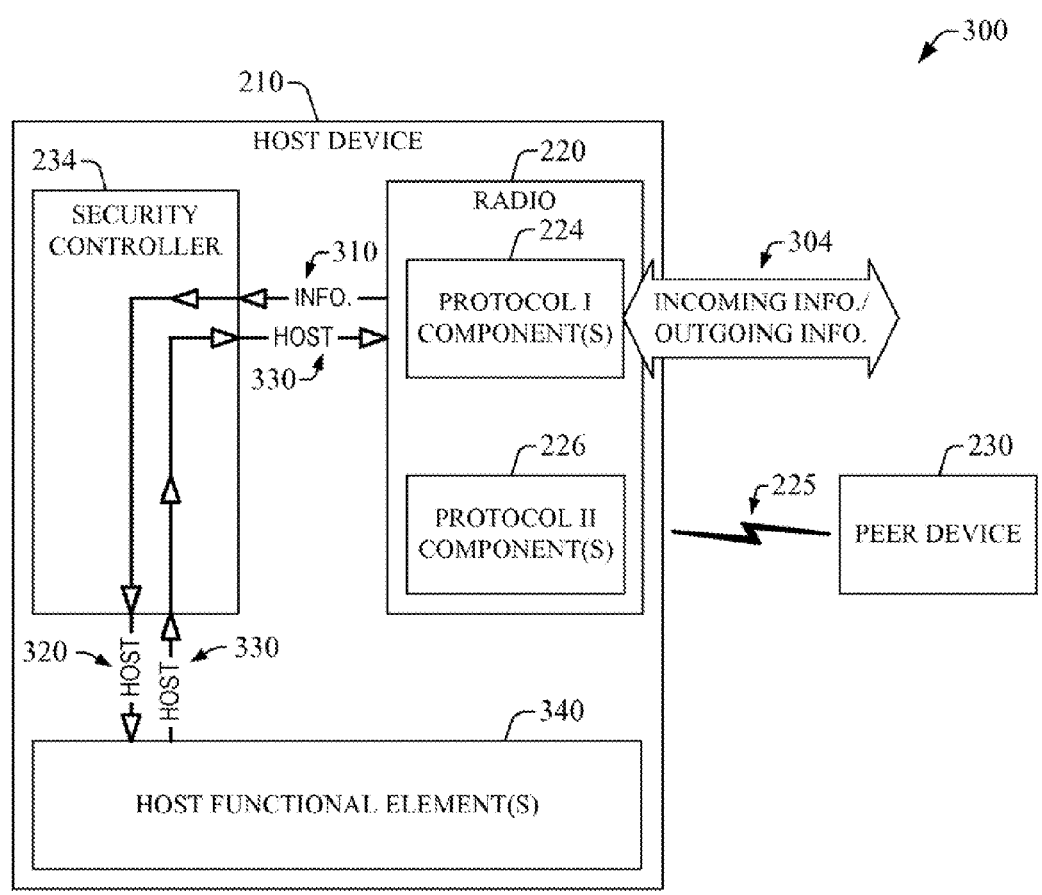
FIG. 3A-3B illustrate example secure communication pathways for information in an example operational environment in accordance with one or more aspects of the disclosure.

FIG. 3A presents an example diagram 300 of secure firmware communication pathways for transporting or otherwise communicating host information in accordance with one or more aspects of the disclosure. The secure communication pathways are represented with labeled open-head arrows. As illustrated, the portion of information 304 that is incoming can be received at the radio unit 220 (also referred to as radio 220) via one or more components 224 that permit communication according to a first radio protocol (referred to as protocol I component(s) 224). Such a portion of information can be referred to as information 310 (labeled as info. 310) and can be conveyed to the security controller 234. The security controller 234 can determine that at least a portion of the information 310 is intended for the host device 210. At least the portion of the information 310 can be referred to as host information 320, and the security controller 234 can convey (e.g., route or otherwise communicate) the information 320 to at least one of the host functional elements 340 (e.g., an operating system (OS) component, a specific software application component, a dedicated functionality platform, or the like). Similarly, host information 330 originated at one or more of the host functional element(s) 340, and intended for communication to a remote network element (e.g., a remote computing device, such as an application server, a content distribution network (CDN) node, an IP multimedia subsystem (IMS) node, or the like), can be conveyed to the security controller 234. As illustrated, the security controller 234 can transmit the host information 330 to the radio 220, which can utilize or otherwise leverage one or more of the protocol I components 224.

Figure 3B:
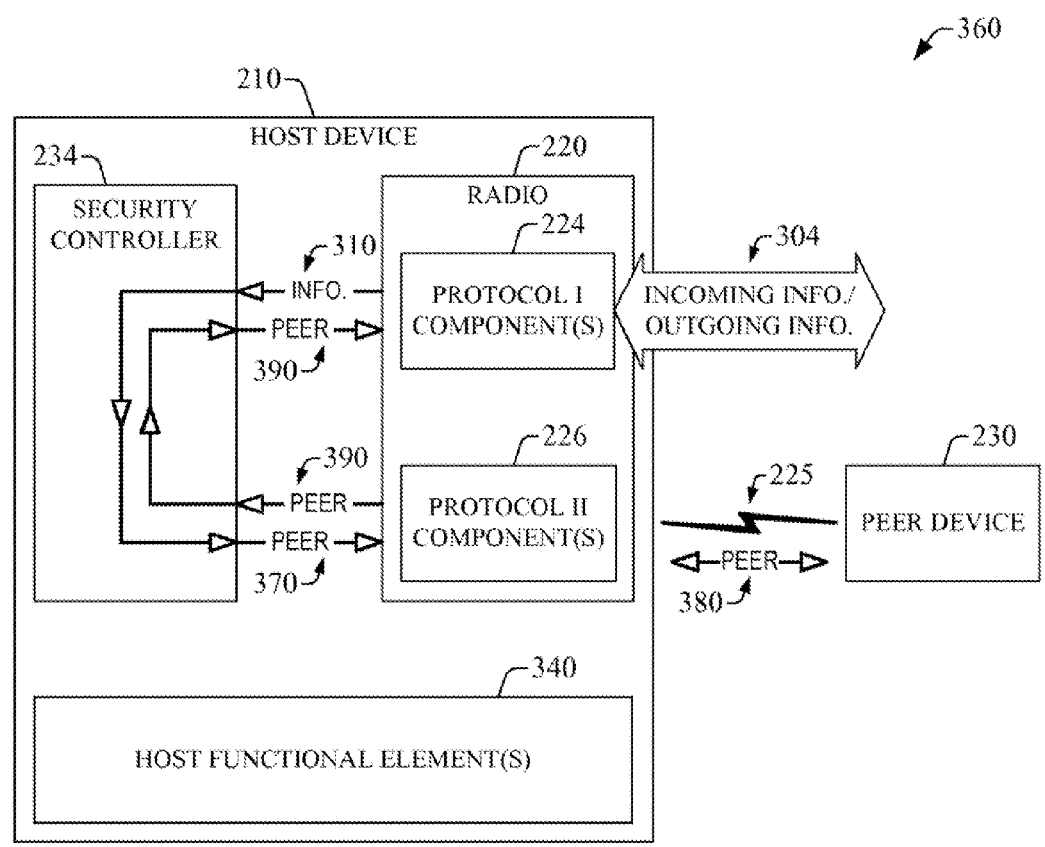

In certain scenarios, the information 304 can include information intended to the peer device 230 or originated from the peer device 230. FIG. 3B presents an example diagram 360 of secure firmware communication pathways for transporting or otherwise communicating peer information in accordance with one or more aspects of the disclosure. The secure communication pathways are represented with labeled open-head arrows in the subject drawing. As described herein, the portion of information 304 that is incoming can be received at the radio 220 via one or more protocol I components 224. In addition, such a portion of the information can be referred to as information 310 and can be conveyed to the security controller 234. The security controller 234 can determine that at least a portion of the information 310 is intended for the peer device 230. As illustrated, at least the portion of the information 310 can be referred to as peer information 370, and the security controller 234 can convey (e.g., route or otherwise transmit) the information 370 to at least one of the protocol II component(s) 228. The radio 220, via the at least one of the protocol II component(s) 226, can transmit wirelessly the peer information 370 within information 380. Similarly, peer information 390 within the peer information 380 can be originated by the peer device 230 and directed to or intended for communication to a remote network element (e.g., a remote computing device (mobile or otherwise), an application server, a CDN node, an IMS node, or the like). As illustrated, the radio 220 can convey the peer information 390 to the security controller 234, and the security controller 234 can convey the peer information 390 to the radio 220, which can utilize or otherwise leverage one or more of the protocol I components 224 for wireless transmission of the peer information 390 within the information 304.

It is readily appreciated that the flow of information between the peer device 230 (or consumer) and the host device 210 (or hotspot) can be routed exclusively through the security controller 234 and thus, in one aspect, such information may not be detectable to one or more of the host functional elements 340. In one aspect, such a routing of information can insulate information directed to or originated from the peer device 230 from information directed to or originated from the host device 210. Accordingly, in one aspect, privacy of the host device 210 may be preserved in scenarios in which cellular-sharing connectivity service is provided.

Figure 4:
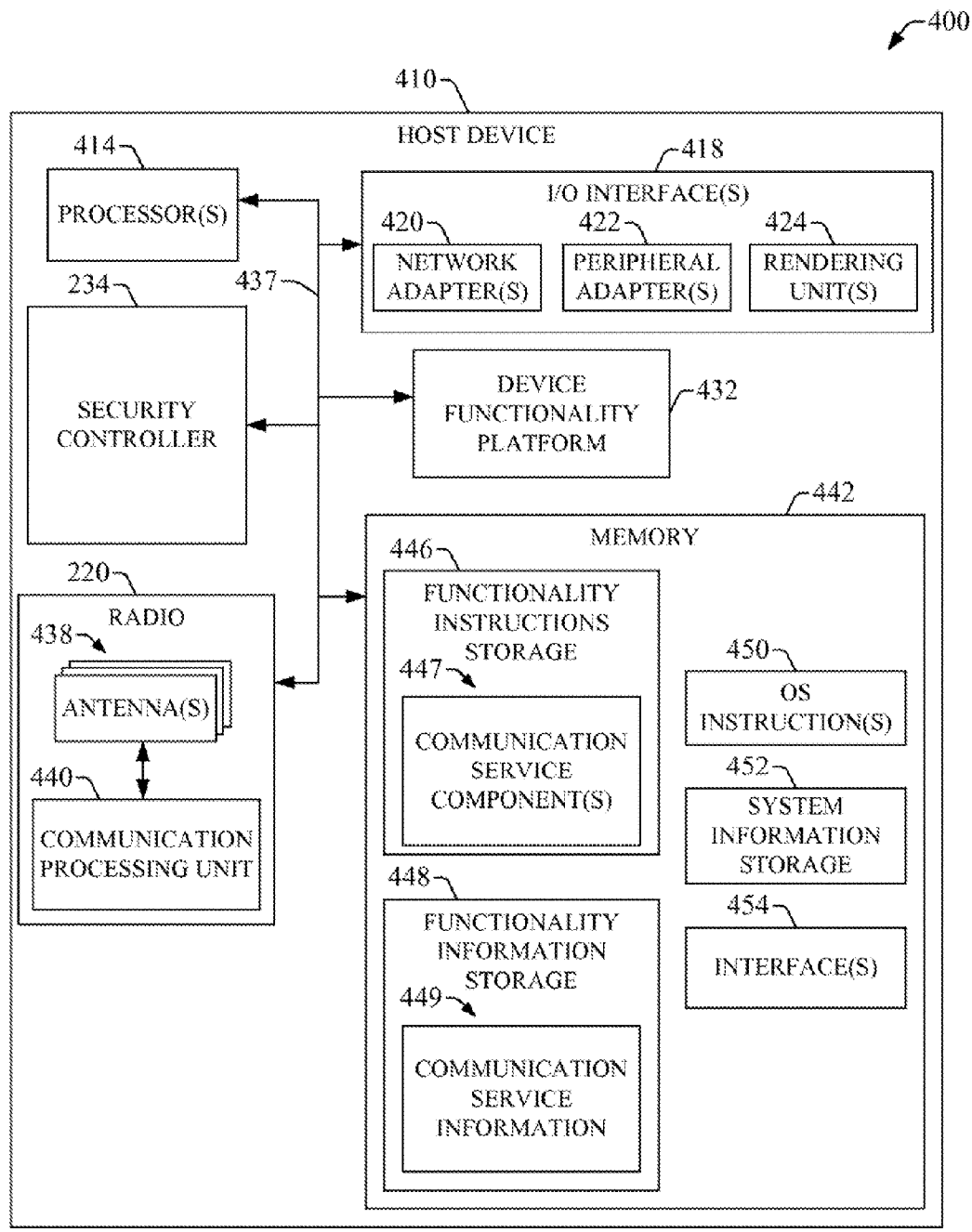
FIG. 4 illustrates an example embodiment of a computing device in accordance with one or more aspects of the disclosure.
Figure 5:
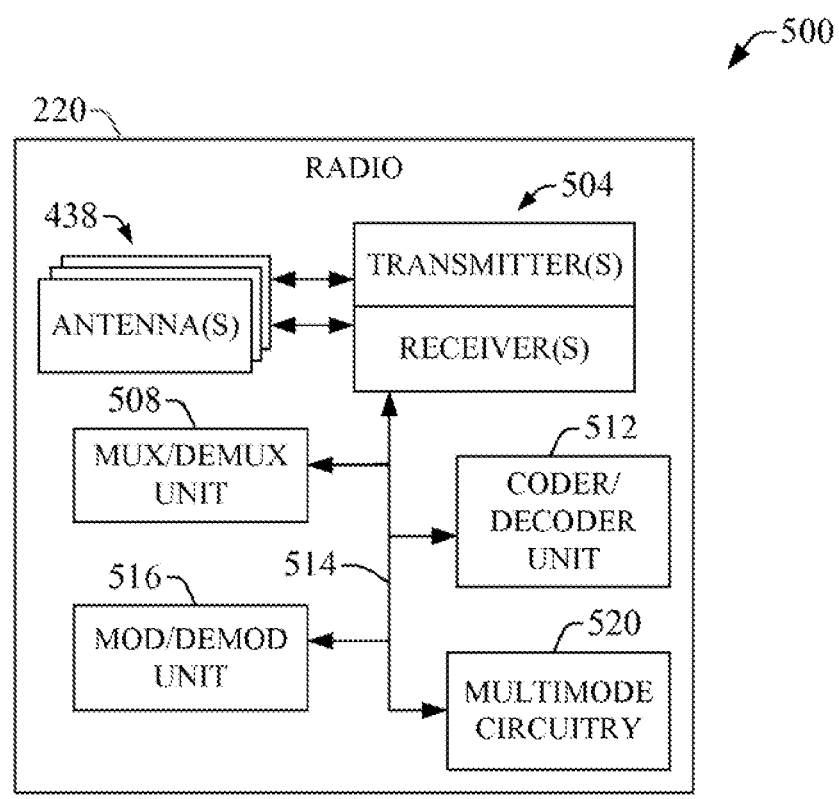
FIG. 5 illustrates another example embodiment of a radio unit in accordance with one or more aspects of the disclosure.

FIG. 4 illustrates a block-diagram of an example embodiment 400 of a host device 410 that can communicate or otherwise operate in accordance with at least certain aspects of the disclosure. As illustrated, the host device 410 is a computing device having processor(s) 414 and one or more memory devices referred to as memory 442. The host device 410 can embody or can comprise the host device 210 or other host devices of the disclosure. In certain implementations, the host device 410 can embody or can comprise user equipment, including wearable devices. In one aspect, the host device 410 can operate as a wireless or mobile device and can embody or can comprise a mobile computing device of the disclosure, such as the mobile device 110 or one of the mobile computing devices $120_1$-$120_N$. To permit wireless communication with a device (e.g., device 160), in one aspect, the host device 410 includes a radio unit 220 having one or more antennas 438 and a communication processing unit 440. As described herein, the radio unit 220 can transmit and/or receive signals wirelessly in accordance with one or more radio protocols. To at least such an end, the radio unit 220 can process signals (analogic and/or digital) in accordance with at least one of the one or more radio protocols. The signal that is transmitted and/or received wirelessly can be referred to as wireless signal. In one embodiment, e.g., example embodiment 500 presented in FIG. 5, the communication processing unit 440 can comprise a set of one or more transmitters/receivers 504, and components therein (e.g., amplifiers, filters, etc.), functionally coupled to a multiplexer/demultiplexer (mux/demux) unit 508, a modulator/demodulator (mod/demod) unit 516 (also referred to as modem 516), and a coder/decoder unit 512 (also referred to as codec 512). Each of the transmitter(s) receiver(s) 504 can form respective transceiver(s) that can transmit and receive wireless signals (e.g., electromagnetic radiation) via the one or more antennas 438. In one implementation, each of the receiver(s) operate as a tuner, collecting wireless signals in specific portions of the electromagnetic (EM) radiation spectrum.

Electronic components and associated circuitry, such as mux/demux unit 508, codec 512, and modem 516 can permit or otherwise facilitate processing and manipulation, e.g., coding/decoding deciphering, and/or modulation/demodulation, of wireless signal(s) received by the host device 410 and wireless signal(s) to be transmitted by the same. In one aspect, received and transmitted wireless signals can be modulated and/or coded, or otherwise processed, in accordance with one or more radio technology protocols—e.g., 3GPP UMTS 3GPP LTE; LTE-A; Wi-Fi; WiMAX; radio technologies and related protocols for ad hoc networks, such as Bluetooth ZigBee; or the like).

The electronic components in the described communication processing unit 440 can exchange information (e.g., data, metadata, code instructions, signaling and related payload data, combinations thereof, or the like) through a bus 514, which can embody or can comprise at least one of a system bus, an address bus, a data bus, a message bus, a reference link or interface, a combination thereof, or the like. Each of the one or more transmitters/receivers 504 can convert a signal from analog to digital and vice versa. In addition or in the alternative, the transmitters/receiver(s) 504 can divide a single data stream into multiple parallel data streams, or perform the reciprocal operation. Such operations may be conducted as part of various multiplexing schemes. As illustrated, the mux/demux unit 508 is functionally coupled to the one or more transmitters/receivers 504 and can permit processing of signals in time and frequency domain. In one aspect, the mux/demux unit 508 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), and/or space division multiplexing (SDM). In addition or in the alternative, in another aspect, the mux/demux unit 508 can scramble and spread information (e.g., codes) according to most any code, such as Hadamard-Walsh codes, Baker codes, Kasami codes, polyphase codes, and the like. The modem 516 can modulate and demodulate information (e.g., data, metadata, and/or signaling) according to various modulation techniques, such as frequency modulation (e.g., frequency-shift keying), amplitude modulation (e.g., M-ary quadrature amplitude modulation (QAM), with M a positive integer; amplitude-shift keying (ASK)); phase-shift keying (PSK); and the like). In addition, the processor(s) 414 can permit or otherwise facilitate the host device 410 to process data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 512 can operate on information (e.g., data, metadata, and/or signaling) in accordance with one or more coding/decoding schemes suitable for communication, at least in part, through the one or more transceivers formed from respective transmitter(s)/receiver(s) 504. In one aspect, such coding/decoding schemes, or related procedure(s), can be retained as a group of one or more computer-accessible instructions (computer-readable instructions, computer-executable instructions, or a combination thereof) in memory 442. In a scenario in which wireless communication among the host device 410 and another device, e.g., peer device 230, utilizes or otherwise leverages multiple-input multiple-output (MIMO), multiple-input single-output (MISO), single-input multiple-output (SIMO), or single-input single-output (SISO) operation, the codec 512 can implement at least one of space-time block coding (STBC) and associated decoding, or space-frequency block coding (SFBC) and associated decoding. In addition or in the alternative, the codec 512 can extract or otherwise acquire information from data streams coded in accordance with spatial multiplexing scheme. In one aspect, at least to decode received information (e.g., data, metadata, and/or signaling), the codec 512 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 512 can utilize or otherwise leverage the mux/demux unit 508 and/or the modem 516 to operate in accordance with aspects described herein.

Multimode circuitry 520 can permit the radio 220 to operate in multiple communication modes through various radio network technologies (e.g., second generation (2G), third generation (3G), fourth generation (4G)) or deep-space satellite-based communication in accordance with disparate technical specifications (or standard protocols) for the radio network technologies or such a satellite communication. The various radio network technologies can be part of the set of radio technologies described herein. In one aspect, the multimode circuitry 520 (e.g., one or more chipsets) can permit the radio unit 220 to operate in accordance with standard protocols specific to a telecommunication mode of operation, e.g., LTE-based communication or Wi-Fi-based communication. In another aspect, the multimode circuitry 520 can be scheduled to operate concurrently in various modes or within a multitask paradigm in which the multimode circuitry 520 can operate in a dedicated mode for a specific period.

The host device 410 can operate in a variety of wireless environments having wireless signals conveyed in different electromagnetic radiation frequency bands. To at least such end, in one aspect, the communication processing unit 440 can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include at least one of (i) all or most licensed EM frequency bands, or (ii) all or most unlicensed frequency bands currently available for telecommunication.

The host device 410 can have specific functionality, which can be provided by a device functionality platform 432. For instance, as described herein, the host device 410 can embody or can include a smartphone, a tablet computer, a gaming console, an electronic book reader, a multimedia composition device (such as a camera), a medical device, a combination of the foregoing, or other user equipment, such as a goggle or helmet-mounted visor. In such embodiments, the device functionality platform 432 can include circuitry and/or structure (e.g., memory components) suitable for permitting voice and data communication, computing, gaming, reading, and/or generation of media assets (e.g., photos, video segments, and the like).

It should be appreciated that, based at least on the specific functionality of the host device 410, the device functionality platform 432 can incorporate, supplement, and/or complement at least one of the input/output (I/O) interface(s) 418. In addition, the device functionality platform 432 can operate in conjunction (e.g., concurrently or sequentially) with other functional elements of the host device 410, such as the radio 220, the security controller 234, and/or at least one of the processor(s) 414. For example, various functional elements and associated circuitry that can embody the device functionality platform 432 can permit data input through one or more gestures (e.g., touch, speech, movement), or one or more communication protocols. Such functional elements can include a keypad, a touch screen, a microphone, a camera, a bar code reader, a radio frequency ID (RFID) reader, an infrared (IR) wireless-based reader, or the like.

As illustrated, the host device 410 comprises one or more processors 414 that can permit, at least in part, the functionality of one or more functional elements of the host device 410 in accordance with at least certain aspects described herein. While in the example embodiment 400, the one or more processors 414 are illustrated as external to the various functional elements (e.g., component(s), interface(s), platform(s), node(s)) of the host device 410, in an additional or an alternative embodiment, the one or more processors 414 can be distributed among a plurality of such functional elements. The one or more processors 414 can be functionally coupled (e.g., communicatively coupled) to the memory 442 and to at least one (e.g., one, two, more than two, or each) functional element within the host device 410 via bus 437. Accordingly, in one aspect, the memory 442 and/or the information contained therein can be referred to as processor-accessible. In certain implementations, the bus 437 can be embodied in or can comprise one or more of a memory bus, a system bus, an address bus, a message bus, a power bus, or one or more reference links or interface(s). The bus 437 can permit exchange of information (data, metadata, and/or signaling) between two or more of the processor(s) 414, one or more of the I/O interface(s) 418, the memory 442, the security controller 234, or the radio unit 220.

In one aspect, the memory 442 can include one or more memory elements 446 having computer-accessible instructions encoded thereon. The computer-accessible instructions can be embodied in or can include computer-readable and/or computer-executable instructions, such as programming code instructions or directives. The one or more memory elements 446 are referred to as functionality instructions storage 446. In certain implementations, the functionality instructions storage 446 can be embodied in a removable element, such as a subscriber identification module (SIM) card storage, a universal integrated circuit card (UICC) storage, or a removable user identity module (RUIM). In another aspect, the memory 442 can comprise functionality information storage 448, which can include information specific to the cellular-sharing connectivity service described in the present disclosure. The functionality instructions storage 446 can comprise computer-accessible instructions that, in response to execution by at least one of the processor(s) 414, can implement one or more of the functionalities of the disclosure in connection with providing the cellular-sharing communication service. The computer-accessible instructions can embody or can comprise one or more software components illustrated as communication service component(s) 447. In one scenario, execution of at least one component of the communication service component(s) 447 can implement one or more of the methods described herein, such as example method 800 present in FIG. 8. For instance, such execution can cause a processor that executes the at least one component to carry out a method of the present disclosure as described in the present specification or annexed drawings. It should be appreciated that in one aspect, a processor of the processor(s) 414 that executes at least one of the communication service component(s) 447 can retrieve information from or retain information available (e.g., retained or stored) in the functionality information storage 448 in order to operate in accordance with the functionality programmed or otherwise configured by the communication service component(s) 736. Such information can include at least one of programming code instructions (or code instructions), information structures, or the like In addition, the memory 442 can comprise computer-accessible instructions and information (e.g., data, metadata, and/or programming code) that permit or otherwise facilitate operation and/or administration (e.g., upgrades, software installation, any other configuration, or the like) of the host device 410. Accordingly, as illustrated, the memory 442 can comprise a memory element 450 (labeled operating system (OS) instruction(s) 450) that can contain one or more program modules that embody or include one or more operating systems, such as a Windows operating system, Unix, Linux, Symbian, Android, Chromium, or substantially any operating system suitable for mobile computing devices or tethered computing devices. In one aspect, the operational and/or architectural complexity of the host device 410 can dictate a suitable operating system. The memory 442 also can comprise a system information storage 452 having data and/or metadata that permits or facilitates operation and/or administration of the host device 410. Elements of the OS instruction(s) 450 and the system information storage 452 can be accessible or can be operated on by at least one of the processor(s) 414.

It should be recognized that while the functionality instructions storage 446 and other executable program components, such as the OS instruction(s) 450, are illustrated herein as discrete blocks, such software components can reside at various times in different memory components of the host device 410, and can be executed by at least one of the processor(s) 414. In certain scenarios, an implementation of the communication service component(s) 736 can be retained on or transmitted across some form of computer-readable media.

In addition, the host device 410 can comprise one or more input/output (I/O) interfaces 418. The bus 437 can include at least one of a system bus, a memory bus, an address bus, or a message bus, and can permit exchange of information (data, metadata, and/or signaling) between two or more of the processor(s) 414, the I/O interface(s) 418, the memory 442, the radio 220, or the security controller 234. In certain scenarios, the bus 437 in conjunction with one or more internal programming interfaces 454 (also referred to as interface(s) 454) can permit such exchange of information. In scenarios in which at least one (e.g., one, two, more than two, or each) of the processor(s) 414 can include multiple processor architectures, the host device 410 can utilize parallel computing.

The I/O interface(s) 418 can permit or facilitate communication of information between the host device 410 and an external device, such as another computing device, e.g., a network element, customer premises equipment, or an end-user device. Such communication can include direct communication or indirect communication, such as exchange of information between the host device 410 and the external device via a network or functional elements thereof. As illustrated, the I/O interface(s) 418 can comprise one or more of network adapter(s) 420, peripheral adapter(s) 422, and rendering unit(s) 424. Such adapter(s) can permit or facilitate connectivity between the external device and one or more of the processor(s) 414 or the memory 442. For example, the peripheral adapter(s) 422 can include a group of ports, which can comprises at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394 ports. Such coupling between the host device 410 and the external device that can be provided by the at least one of the network adapter(s) 420 can be implemented in a wired environment, a wireless environment, or both. The information that is communicated by the at least one of the network adapter(s) 918 can result from implementation of one or more operations in a method of the disclosure. Such output can be any form of visual representation, including, but not limited to, textual, graphical, animation, audio, tactile, and the like. In addition or in the alternative, the rendering unit(s) 424 can include functional elements (e.g., lights, such as light-emitting diodes; a display, such as a liquid crystal display (LCD), a plasma monitor, a light emitting diode (LED) monitor, or an electrochromic monitor combinations thereof; or the like) that can permit control of the operation of the host device 410, or can permit conveying or revealing operational conditions of the host device 410.

In certain embodiments, the peer devices of the disclosure can have substantially the same architecture as the host device 410. In other embodiments, a peer device can have a similar architecture to that of the host device 410, where certain functional elements are absent or not configured for operation. For example, the peer device may not include a security controller such as the security controller 234.

Figure 6:
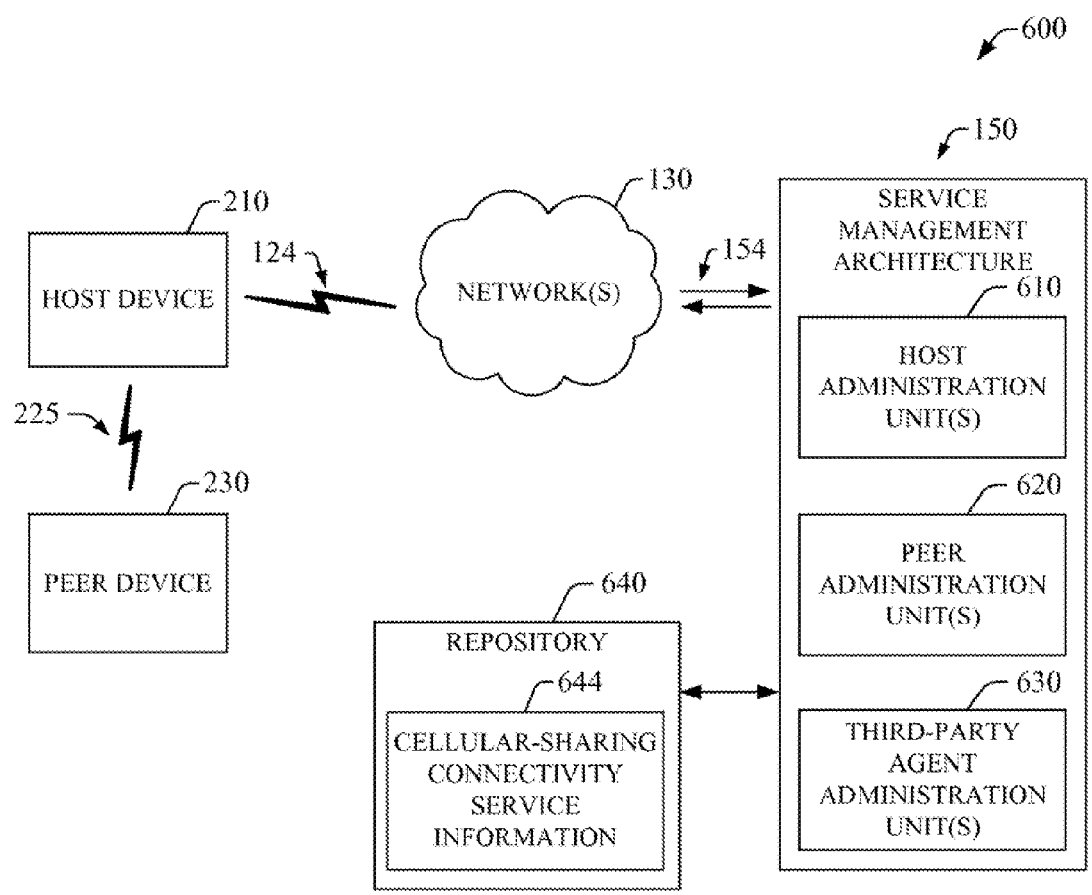
FIG. 6 illustrates another example operational environment in accordance with one or more aspects of the disclosure.

FIG. 6 illustrated an example operational environment 600 in which a cellular-sharing connectivity service can be implemented in accordance with one or more aspects of the disclosure. As described herein, the service backend management 150 can comprise several units for administration of the cellular-sharing connectivity service, including one or more host administration units 610, one or more peer administration units 620, and one or more third-party agent administration units 630. In one aspect, a unit of the host administration unit(s) 610 can receive service activation information and, in response, can configure the host device 210 as a service provider and the peer device 230 as a consumer. Similarly, in another aspect, a unit of the peer administration unit(s) 620 can receive service activation information and, in response, can configure the peer device 230 as a consumer. At least a portion of the service activation, including, for example, configuration information associated with a mobile device (e.g., a consumer or a service provider) information can be retained in one or more memory elements 644 (labeled generically as cellular-sharing connectivity service information storage 644) within the repository 640 functionally coupled to the service backend management 150. Embodiments in which the repository 640 is integrated into the service backend management 150 also can be contemplated in the present disclosure.

At least one of the host administration unit(s) 610 can receive information indicative of a service configuration from the host device 210, wherein the configuration information is indicative or otherwise representative of specific features of the cellular-sharing connectivity service. As described herein, the service configuration can establish, for example, a set of permissible peer devices, service pricing, scope of service (e.g., amount of information that can be supplied to a peer device), a combination thereof, or the like.

It should be appreciated that such one or more units (such as a handoff unit; not depicted in FIG. 6) of the host administration unit(s) 610 can receive activation information from a group of peer devices (e.g., mobile device 160) and can configure a stack or other information structure indicative of one or more service providers. In one embodiment, such an information structure can comprise a data structure and associated data objects and/or method(s). Availability of such a stack or other information can permit handing over a peer device from one host device, such as peer device 230, to another host device. In one example handoff scenario, such a handoff unit can select a host device from the stack in order to be hand over the peer device 230 from the host device 210. Selection can be based at least in part on transmitted signal strength and/or other factors. In addition, the handoff unit can terminate a communication session between the peer device 230 and the host device 210, and can establish or otherwise can permit establishment of another communication session between the peer device 230 and the host device 210 selected for handoff.

In another aspect, another unit of the host administration unit(s) 610 can process a payment in exchange for the cellular-sharing connectivity service provided by the host device 210. In one example implementation, such a unit can receive a payment and can transfer or otherwise accrue the payment to the host device 210. The payment can be a monetary payment or a non-monetary payment, such as connectivity points or other predetermined units of non-monetary currency (e.g., loyalty program points, such as frequent flier points (or airmiles)). Accrual of payment, such as accrual of connectivity points, can be recorded or otherwise retained in the cellular-sharing connectivity service information storage 644.

As described herein, a host device (or a mobile computing device capable of providing the cellular-sharing connectivity service of the disclosure) can have a profile that can be retained in the cellular-sharing connectivity service information storage 644. At least one of the host administration unit(s) 610 can manage the sharing of the host device's connectivity to one or more of the network(s) 130 and resources thereof via the cellular-sharing connectivity service. In one aspect, the host device can be awarded or otherwise assigned connectivity points and/or other form of compensation (monetary or non-monetary) according to a predetermined compensation model, e.g., connectivity points can be awarded based at least in part on connection time that the host device (e.g., device 210) provides to a peer device (e.g., device 230). The compensation model can be included or otherwise logically related to a transactional model for access to the cellular-sharing connectivity service. In certain embodiments, the transactional model or information indicative thereof can be retained or otherwise recorded on a memory device integrated into or functionally coupled to one or more of the host administration unit(s) 610.

In certain scenarios, an advertiser can subsidize, entirely or partially, payment for the cellular-sharing connectivity service provided to a peer device. For instance, a peer device may lack sufficient currency, either monetary or non-monetary (such as connectivity points), to access the cellular-sharing connectivity service. In response, in one aspect, the advertiser can subsidize the payment in exchange for exposing the peer device to advertisement content. In such scenarios, at least one unit of the one or more third-party agent administration units 630 can acquire (e.g., generate, collect, or receive) or otherwise procure advertisement content and can transmit at least a portion of such content to the peer device 230 via the host device 210. At least a portion of the advertisement content can be customized to an end-user associated with the peer device 230 based at least in part on, for example, specific characteristics of the end-user associated with the peer device 230. For instance, such advertisement content can be customized based at least in part on context of the end-user and/or specific interests of the end-user (such as hobbies). Such a context can include, in certain embodiments, location of the peer device 230; destination computing device(s) included in a communication session with the peer device 230; information consumed by the peer device 230 via the cellular-sharing connectivity service; time that at least a portion of such information is consumed by the peer device 230; historical information (e.g., historical data and/or historical metadata) consumed by the peer device 230, a combination of the foregoing, or the like. In certain implementations, information associated with an end user, including information indicative of context and/or specific interests of the end-user, can be acquired (e.g., retrieved or otherwise received) from at least one network element of the network(s) 130. In one embodiment, the advertisement content can be received from an advertiser platform, which can be embodied or included in one of the information sources 140. In another embodiment, the at least one unit of the third-party agent administration unit(s) 630 can direct (e.g., transmit a command or instruction) to a network element of one of the network(s) 130 to generate the advertisement content.

Figure 7:
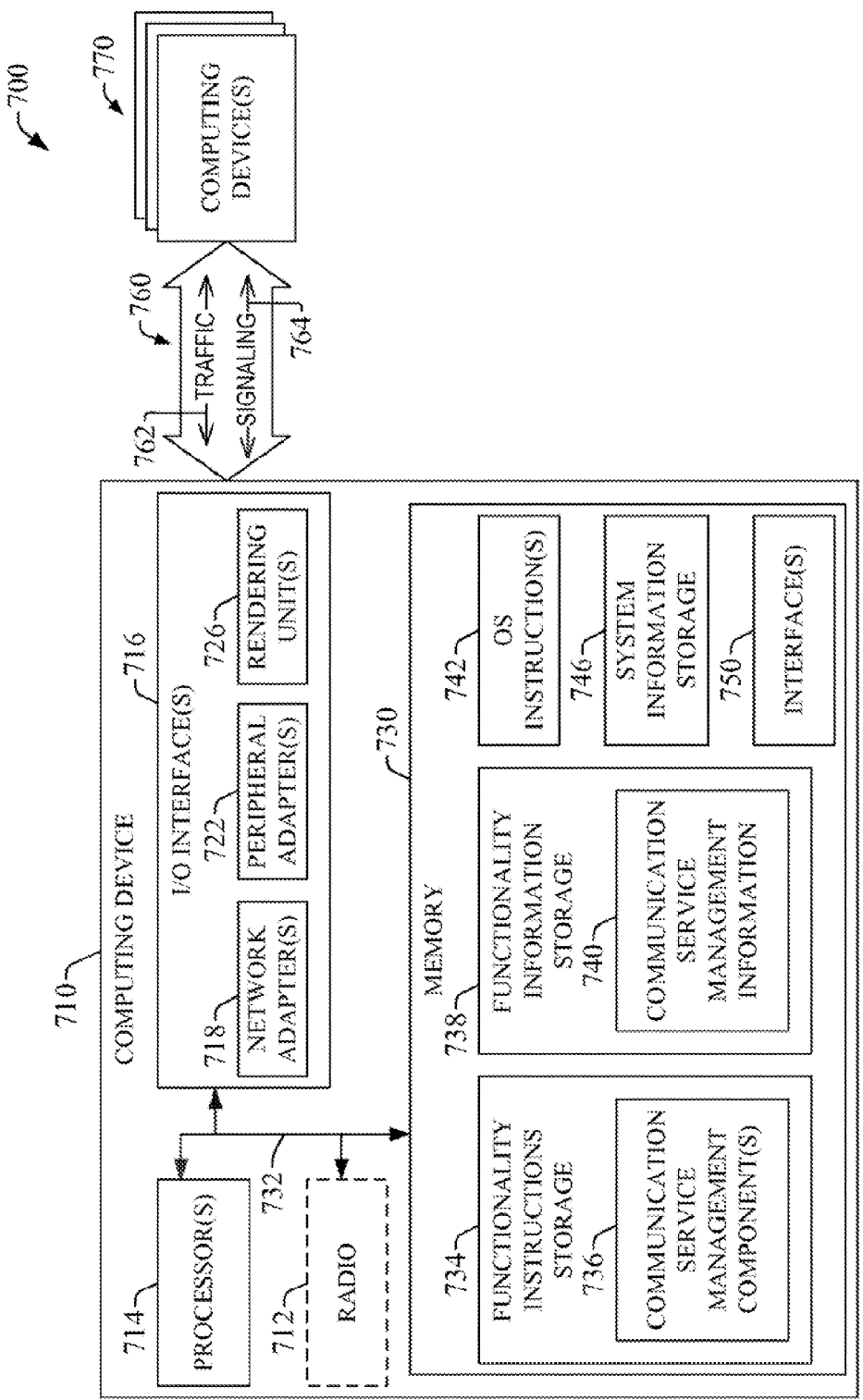
FIG. 7 illustrates another example embodiment of a computing device in accordance with one or more aspects of the disclosure.

FIG. 7 illustrates a block diagram of an example operational environment 700 for a cellular-sharing connectivity service in accordance with one or more aspects of the disclosure. The example operational environment is merely illustrative and is not intended to suggest or otherwise convey any limitation as to the scope of use or functionality of the operational environment's architecture. In addition, the example operational environment 700 depicted in FIG. 7 should not be interpreted as having any dependency or requirement relating to any one or combination of components illustrated as part of the operational environment 700.

The operational environment 700 comprises a computing device 710 which, in various embodiments, can correspond to the one or more of the service management units 250.

The operational environment 700 illustrates an example implementation of the various aspects or features of the disclosure in which the processing or execution of operations described in connection with the cellular-sharing connectivity service disclosed herein can be performed at least in response to execution of one or more software components at the computing device 710. It should be appreciated that the one or more software components can render the computing device 710, or any other computing device that contains such components, a particular machine for providing a cellular-sharing connectivity service as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 8. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the cellular-sharing connectivity service described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers (PLCs), distributed computing environments that comprise any of the above systems or devices, or the like.

As illustrated, the computing device 710 can comprise one or more processors 714, one or more input/output (I/O) interfaces 716, one or more memory devices 730 (herein referred to generically as memory 730), and a bus architecture 732 (also termed bus 732) that functionally couples (e.g., communicatively couples) various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can comprise at least one of parallel ports, serial ports, Ethernet ports, V.35 ports, or X.21 ports, wherein parallel ports can comprise one or more of GPIB ports and/or IEEE-1284 ports, while serial ports can include RS-232 ports, V.11 ports, USB ports, or FireWire or IEEE-1394 ports.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or a combination of both. The information that is communicated by the at least one of the network adapter(s) 718 can result from implementation of one or more operations in a method of the disclosure. Such output can include any form of visual representation, including, but not limited to, textual, graphical, animation, audio, tactile, or the like. In certain scenarios, each of the computing device(s) 770 can have substantially the same architecture as the computing device 710. In addition, or in the alternative, the rendering unit(s) 726 can include functional elements (e.g., lights, such as light-emitting diodes; a display, such as a LCD, a plasma monitor, a LED monitor, an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or memory controller, a peripheral bus, an accelerated graphics port, and a processor or local bus using any of a variety of bus architectures. As an illustration, such architectures can comprise an industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card industry Association (PCMCIA) bus, a Universal Serial Bus (USB), and the like. The bus 732, and all buses described herein, can be implemented over a wired or wireless network connection, and each of the subsystems, including the processor(s) 714, the memory 730 and memory elements therein, and the I/O interface(s) 716 can be contained within one or more remote computing devices 770 at physically separate locations, connected through buses of this form, thereby effectively implementing a fully distributed system.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM). As described herein, the memory 730 can be functionally coupled to at least one of the processors 714 and thus, in one aspect, can be referred to as a processor-accessible storage device.

The memory 730 can comprise functionality instructions storage 734 and functionality information storage 738. The functionality instructions storage 734 can comprise computer-accessible instructions that, in response to execution by at least one of the processor(s) 714, can implement one or more of the functionalities of the disclosure. The computer-accessible instructions can embody or can comprise one or more software components illustrated as communication service management component(s) 736. In one scenario, execution of at least one component of the communication service management component(s) 736 can implement one or more of the methods described herein, such as example method 800. For instance, such execution can cause a processor that executes the at least one component to carry out a disclosed example method. It should be appreciated that, in one aspect, a processor of the processor(s) 714 that executes at least one of the communication service management component(s) 736 can retrieve information from or retain information in a memory element 740 in the functionality information storage 738 in order to operate in accordance with the functionality programmed or otherwise configured by the communication service management component(s) 736. Such information can include at least one of programming code instructions (or code instructions), information structures, or the like. At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of the communication service management component(s) 736 or communication service management information 740 can program or otherwise configure one or more of the processors 714 to operate at least in accordance with the functionality described herein. In one embodiment, the communication service management component(s) 736 contained in the functionality instruction(s) storage 734 can include at least one of the host administration unit(s) 610, at least one of the peer administration unit(s) 620, and/or at least one of the third-party agent administration unit(s) 630. It should be recognized that in such an embodiment, hardware or firmware functional elements of the at least one of the host administration unit(s) 610, at least the one of the peer administration unit(s) 620, and/or at the least one of the third-party agent administration unit(s) 630 can be embodied in suitable components of the computing device 710. One or more of the processor(s) 714 can execute at least one of the communication service management component(s) 736 and can leverage at least a portion of the information in the functionality information storage 738 in order to provide a cellular-sharing connectivity service in accordance with one or more aspects described herein. It should be appreciated that, in certain scenarios, the functionality instructions storage 734 can embody or can comprise a computer-readable non-transitory storage medium having computer-accessible instructions that, in response to execution, cause at least one processor (e.g., one or more of processor(s) 714) to perform a group of operations comprising the operations or blocks described in connection with the disclosed methods.

In addition, the memory 730 can comprise computer-accessible instructions and information (e.g., data, metadata, and/or programming code) that permit or facilitate operation and/or administration (e.g., upgrades, software installation, any other configuration, or the like) of the computing device 710. Accordingly, as illustrated, the memory 730 can comprise a memory element 742 (labeled operating system (OS) instruction(s) 742) that can contain one or more program modules that embody or include one or more operating systems, such as a Windows operating system, Unix, Linux. Symbian, Android, Chromium, or substantially any operating system suitable for mobile computing devices or tethered computing devices. In one aspect, the operational and/or architectural complexity of the computing device 710 can dictate a suitable operating system. The memory 730 also comprises a system information storage 746 having data and/or metadata that permits or facilitates operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the communication service management component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or at least one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wireline link(s) and/or wireless link(s) and several network elements (such as routers or switches, concentrators, servers, and the like) that form a local area network (LAN), a metropolitan area network (MAN), and/or a wide area network (WAN). Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

Figure 8:
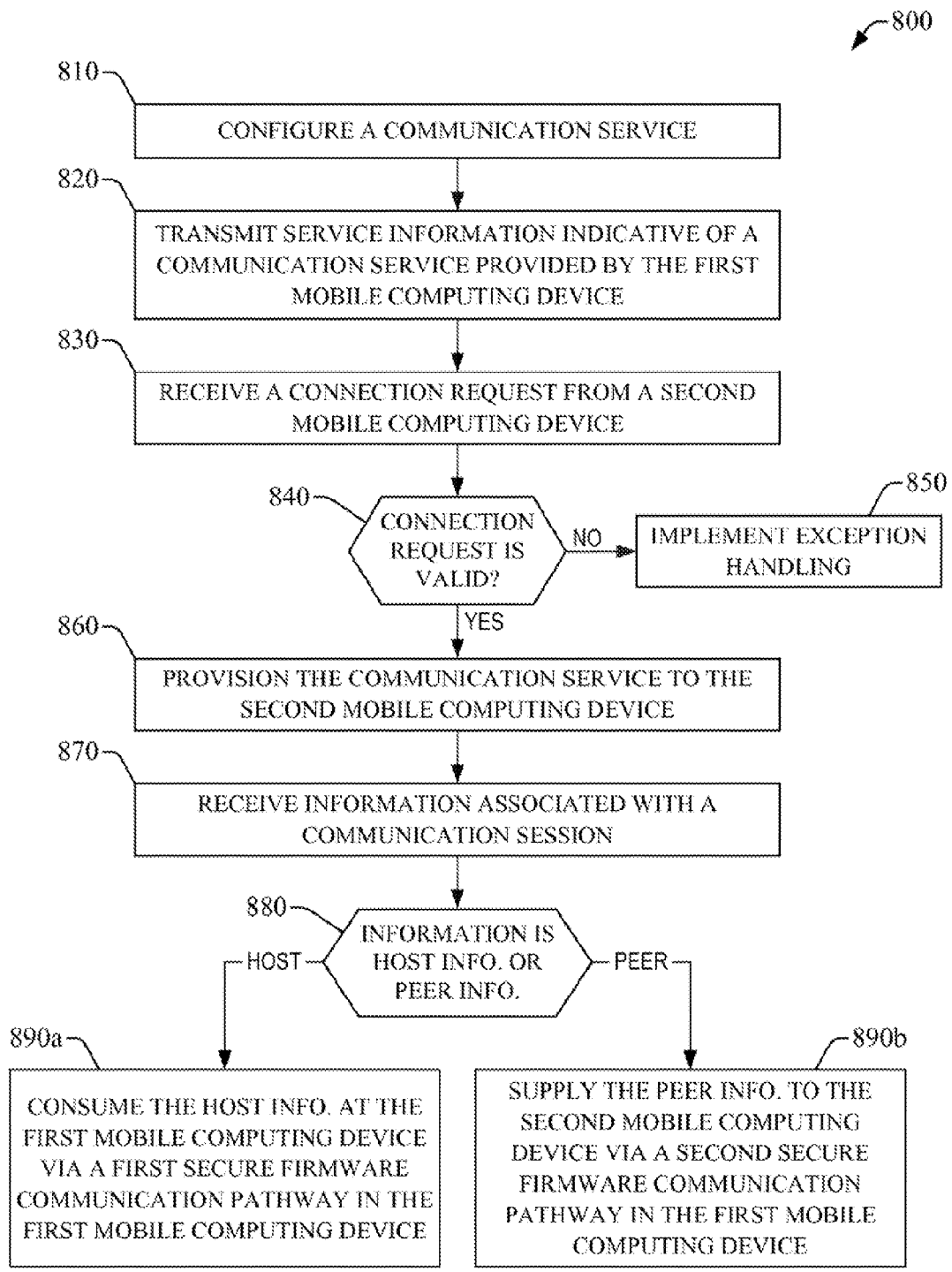
FIG. 8 presents an example method in accordance with one or more aspects of the disclosure.

In view of the aspects described herein, example methods that can be implemented in accordance with the disclosure can be better appreciated with reference to the flowchart in FIG. 8. For purposes of simplicity of explanation, the example method disclosed herein is presented and described as a series of blocks (with each block representing, for example, an action or an operation in a method). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as a tablet, or a smartphone; a gaming console; a mobile telephone; a blade computer; a programmable logic controller, and the like) for execution and thus, implementation by a processor of the computing device or for storage in a memory device (or memory) thereof or functionally coupled thereto. In one aspect, one or more processors, such as processor(s) that implement (e.g., compile, link, and/or execute) one or more of the disclosed methods, can be employed to execute instructions (e.g., programming instructions) retained in a memory, or any computer- or machine-readable medium, to implement at least one of the one or more methods. The instructions can provide a computer-executable or machine-executable framework to implement the methods disclosed herein.

FIG. 8 presents a flowchart of an example method 800 for wireless communication service according to at least certain aspects of the disclosure. One or more computing devices having at least one processor or being functionally coupled to at least one processor can implement (e.g., compile, link, execute, compile and execute, link and execute, compile, link, and execute, etc.) one or more blocks of the subject example method. In other scenarios, one or more blocks of the example method 800 can be implemented in a distributed fashion by two or more computing devices contained in a system. Each of the two or more computing devices can have at least one processor or can be functionally coupled to at least one processor, where such processor(s) can implement at least one of the one or more blocks.

At block 810 a communication service can be configured by a first mobile computing device. As described herein, the first mobile computing device can provide, at least in part, the communication service. In one aspect, the communication service can comprise wireless delivery of information or wireless exchange of information. As described herein, in one aspect, the information that is delivered and/or exchanged can include blog feeds, news feeds, media content, a combination thereof, or the like. The first mobile computing device can be the computing device that implements the subject example method. At block 820, service information indicative of the communication service provided by the first mobile computing device can be transmitted. The service information can be transmitted by the first mobile computing device. Block 820 can be referred to as a transmitting operation and, in one aspect, can comprise broadcasting the service information. It should be appreciated that in other aspects, the transmitting operation can comprise multi-casting and/or unicasting the service information. At block 830, a connection request (e.g., connection request 204) can be received from a second mobile computing device. The connection request can be received by the first mobile computing device that provides the communication service. At block 840, it can be determined if the connection request is valid. Such a determination can be performed by the first mobile device and, in one aspect, the determination can be effected at the first mobile device by applying access rules associated with or otherwise defined by a transactional model for access to the communication service or by receiving authorization information from a remote computing device. In a scenario in which it is ascertained that the connection request is invalid, exception handling can be implemented at block 850 in response to ascertaining that the request is invalid (flow labeled as "No" in FIG. 8). In the alternative, in a scenario in which it is ascertained that the connection request 204 is valid, the communication service can be provisioned to the second mobile computing device at block 860 in response to ascertaining that the connection request 204 is valid (flow labeled as "Yes" in FIG. 8). As described herein, in one example implementation, the first mobile computing device can determine the validity of the connection request based at least on a set of one or more access rules. Accordingly, in one example, a valid connection request 204 can be a request that is associated with an authorized mobile computing device.

At block 870, information (e.g., data, metadata, and/or signaling) associated with a communication session can be received. The communication session can be originated by or otherwise associated with the first mobile computing device or the second mobile computing device. At block 880, it is determined if the information is or includes host information or peer information. As described herein, host information comprises information directed to the first mobile computing device, which provides the communication service, and peer information comprises information directed to the second mobile computing device, which has been provisioned with the communication service. In an example scenario in which the information is or includes host information, at block 890*a* such host information can be consumed at the first mobile computing device via a first secure firmware pathway. As described herein, such a pathway can be referred to as first secure firmware communication pathway. In an example scenario in which the information is or includes peer information, at block 890*b* such peer information can be supplied to the second mobile computing device via a second secure firmware pathway. As described herein, such a pathway can be referred to as second secure firmware communication pathway. Collectively, blocks 870-890*b* can embody or constitute the operation of supplying, in response to the provisioning, information via a secure firmware communication pathway (within the computing device that implements the subject example method) based at least in part on an intended recipient device (e.g., the host device or a component thereof, the peer device, or the like) for at least a portion of the information.

It should be appreciated that while illustrated as a block subsequent to block 860, the information associated with a communication session can be received in any other order with respect to a block in the subject example method. For instance, such information can be received prior to the communication service being configured, or prior to the communication service being provisioned to the second mobile computing device. Stated in alternative terminology, the information associated with the communication session can be received at the first mobile computing device asynchronously with respect to any of the blocks 810-860.

Further or alternative example embodiments of the disclosure emerge from the description herein and annexed drawings. In one example embodiment, the disclosure provides a method for wireless communication. The method can comprise transmitting, by a first mobile computing device having at least one or more processors, service information indicative of a communication service provided by the first mobile computing device. In addition, the method can comprise receiving, by the first mobile computing device, a connection request from a second mobile computing device in response to the transmitting. The method also can comprise determining if the connection request is valid. Such a determination can be performed by the first mobile device and, in one aspect, the determination can be effected at the first mobile device by applying access rules associated with or otherwise conveyed by a transactional model for access to the communication service or by receiving authorization information from a remote computing device. Further, the method also can comprise provisioning by the first mobile computing device, the communication service to the second mobile computing device in response to ascertaining that the connection request is valid. Moreover, the method can comprise supplying, by the first mobile computing device in response to the provisioning, information via a secure firmware communication pathway within the first mobile computing device based at least in part on an intended recipient device for at least a portion of the information.

In one aspect, the intended recipient device can comprise the second mobile computing device. In addition, supplying information via a secure firmware communication pathway within the first mobile computing device based at least in part on an intended recipient device for at least a portion of the information can comprise transmitting at least the portion of the information to the second mobile computing device via a first secure firmware communication pathway. In one scenario, the supplying also can comprise initiating a communication session with the second mobile computing device prior to transmitting at least the portion of the information to the second mobile computing device via the first secure communication pathway. In one aspect, the initiating comprises establishing a packet-switching protocol tunnel between the second mobile computing device and a remote computing device associated with the first mobile computing device. In addition, the method can further comprise transmitting, by the first mobile computing device, session information indicative of the communication session to a remote computing device.

In another aspect, the intended recipient device comprises a component of the first mobile computing device. In addition, supplying information via a secure firmware communication pathway within the first mobile computing device based at least in part on an intended recipient device for at least a portion of the information can comprise transmitting at least the portion of the information to the component via a second secure firmware communication pathway.

In certain scenarios, the method can comprise receiving, by the first mobile computing device, second information according to a radio communication protocol via a second secure firmware communication pathway. In one aspect, transmitting at least the portion of the information to the second mobile computing device via the second secure firmware communication pathway comprises transmitting at least the portion of the information to the second mobile computing device according to a second radio communication protocol. In another aspect, the intended recipient device comprises the second mobile computing device, and supplying information via a secure firmware communication pathway within the first mobile computing device based at least in part on an intended recipient device for at least a portion of the information further comprises supplying advertisement content to the second mobile computing device, the advertisement content is customized to an end-user associated with the second mobile computing device.

In the method, in certain scenarios, receiving, by the first mobile computing device, a connection request from a second mobile computing device in response to the transmitting can comprise receiving information indicative of a payment from the second mobile computing device, wherein the payment is received in exchange for access to the communication service. In addition, the method can further comprise activating, by the first mobile computing device, the communication service for the second mobile computing device at a remote computing device. In one aspect, the activating can comprise transmitting information indicative of an identity of the second mobile computing device and a payment mode for the second mobile computing device to access the communication service, the payment mode is one of direct payment or third-party payment.

The method also can comprise configuring, by the first mobile computing device, the communication service prior to the transmitting. In one aspect, the configuring comprises establishing a pricing for payment in exchange for access to the communication service. In another aspect, the configuring comprises establishing a group of peer mobile computing devices permitted to access the communication service. In yet another aspect, the establishing comprises determining a number of peer mobile computing devices included in the group of peer mobile computing devices or an identity of at least one of the group of peer mobile computing devices. In addition, in yet another aspect, the configuring can further comprise establishing, by the first mobile computing device, a quota of peer information available to at least one of the group of peer mobile computing devices that is provisioned for the communication service.

In another example embodiment, the disclosure can provide an apparatus for wireless communication. The apparatus can comprise means transmitting service information indicative of a communication service provided by a first mobile computing device comprising the apparatus. The apparatus also can comprise means for receiving a connection request (e.g., request 204) from a second mobile computing device in response to the transmitting. In addition, the apparatus can comprise means for determining if the connection request is valid. Further, the apparatus can comprise means for provisioning the communication service to the second mobile computing device in response to ascertaining that the connection request is valid.

Furthermore, the apparatus can comprise means for supplying information via a secure firmware communication pathway within the first mobile computing device based at least in part on an intended recipient device for at least a portion of the information. In one aspect, the intended recipient device comprises the second mobile computing device, and wherein the means for supplying comprises means for transmitting at least the portion of the information to the second mobile computing device via a first secure firmware communication pathway.

In addition, the means for supplying information via a secure firmware communication pathway within the first mobile computing device based at least in part on an intended recipient device for at least a portion of the information can comprise means for initiating a communication session with the second mobile computing device prior to transmitting at least the portion of the information to the second mobile computing device via the first secure communication pathway. In one aspect, the means for initiating can comprise means for establishing a packet-switching protocol tunnel between the second mobile computing device and a remote computing device associated with the first mobile computing device. In another aspect, the apparatus can further comprise means for transmitting session information indicative of the communication session to a remote computing device.

In another aspect, the intended recipient device comprises a component of the first mobile computing device (e.g., an OS component of the host device 210), and wherein the means for supplying comprises means for transmitting at least the portion of the information to the component via a second secure firmware communication pathway.

In certain implementations, the apparatus can comprise means for receiving second information according to a radio communication protocol via a second secure firmware communication pathway. In one aspect, the means for transmitting at least the portion of the information to the second mobile computing device via the second secure firmware communication pathway comprises means for transmitting at least the portion of the information to the second mobile computing device according to a second radio communication protocol.

As described herein, in one implementation, the intended recipient device can comprises the second mobile computing device, and the means for supplying information via a secure firmware communication pathway within the first mobile computing device based at least in part on an intended recipient device for at least a portion of the information can further comprise means for supplying advertisement content to the second mobile computing device, the advertisement content is customized to an end-user associated with the second mobile computing device.

In other implementations, the means for receiving a connection request from a second mobile computing device in response to the transmitting can comprise means for receiving information indicative of a payment from the second mobile computing device, wherein the payment is received in exchange for access to the communication service.

In apparatus also can comprise means for activating the communication service for the second mobile computing device at a remote computing device, wherein the means for activating comprises means for transmitting information indicative of an identity of the second mobile computing device and payment mode for the second mobile computing device to access the communication service. The payment mode comprises one or more of direct payment or third-party payment.

In certain implementations, the apparatus also can comprise means for configuring the communication service prior to the transmitting. In one aspect, the means for configuring can comprise means for establishing a pricing for payment in exchange for access to the communication service. In another aspect, the means for configuring can comprise means for establishing a group of peer mobile computing devices permitted to access the communication service. In yet another aspect, the means for establishing comprises means for determining a number of peer mobile computing devices included in the group of peer mobile computing devices or an identity of at least one of the group of peer mobile computing devices. In addition, the means for configuring further comprises means for establishing an amount of peer information available to at least one of the group of peer mobile computing devices that is provisioned for the communication service.

In another example embodiment, the disclosure provides at least one processor-accessible storage device having programmed instructions for wireless communication that in response to execution, cause at least one processor to perform operations comprising transmitting service information indicative of a communication service provided by a first mobile computing device including the at least one processor. The operations also can comprise receiving a connection request from a second mobile computing device in response to the transmitting. In one aspect, the receiving operation can comprise receiving information indicative of a payment from the second mobile computing device, wherein the payment is received in exchange for access to the communication service. In addition, the operations can comprise determining if the connection request is valid. Further, the operations can comprise provisioning the communication service to the second mobile computing device in response to ascertaining that the connection request is valid. Furthermore, the operations can comprise supplying, in response to the provisioning, information via a secure firmware communication pathway within the first mobile computing device based at least in part on an intended recipient device for at least a portion of the information.

In one scenario, in the provided at least one processor-accessible storage device, the intended recipient device comprises the second mobile computing device. In addition, supplying information via a secure firmware communication pathway within the first mobile computing device based at least in part on an intended recipient device for at least a portion of the information can comprise transmitting at least the portion of the information to the second mobile computing device via a first secure firmware communication pathway.

In another scenario, in the provided at least one processor-accessible storage device, the intended recipient device comprises a component of the first mobile computing device. In addition, supplying information via a secure firmware communication pathway within the first mobile computing device based at least in part on an intended recipient device for at least a portion of the information can comprise transmitting at least the portion of the information to the component via a second secure firmware communication pathway. As described herein, the supplying information can be effected in response to provisioning the communication service to the second mobile computing device in response to ascertaining that the connection request is valid. In one aspect, the operations can further comprise receiving second information according to a radio communication protocol via a second secure firmware communication pathway, wherein transmitting at least the portion of the information to the second mobile computing device via the second secure firmware communication pathway comprises transmitting at least the portion of the information to the second mobile device according to a second radio communication protocol.

In the provided at least one processor-accessible storage device, in certain implementations, the intended recipient device can comprise the second mobile computing device. In addition, supplying information via a secure firmware communication pathway within the first mobile computing device based at least in part on an intended recipient device for at least a portion of the information can further comprise supplying advertisement content to the second mobile computing device, the advertisement content is customized to an end-user associated with the second mobile computing device.

In the provided at least one processor-accessible storage device, the operations also can comprise further comprising activating, by the first mobile computing device, the communication service for the second mobile computing device at a remote computing device. In one aspect, the activating comprises transmitting information indicative of an identity of the second mobile computing device and payment mode for the second mobile computing device to access the communication service, the payment mode is one of direct payment mode or third-party payment mode, or a combination of such modes.

In certain implantations, in the provided at least one processor-accessible storage device, supplying information via a secure firmware communication pathway within the first mobile computing device based at least in part on an intended recipient device for at least a portion of the information can comprise initiating a communication session with the second mobile computing device prior to transmitting at least the portion of the information to the second mobile computing device via the first secure communication pathway. As described herein, the supplying information can be effected in response to provisioning the communication service to the second mobile computing device in response to ascertaining that the connection request is valid. In one aspect, the initiating comprises establishing a packet-switching protocol tunnel between the second mobile computing device and a remote computing device associated with the first mobile computing device. In addition, the operations further comprise transmitting session information indicative of the communication session to a remote computing device.

In the provided at least one processor-accessible storage device, in at least one implementation, the operations further comprise configuring the communication service prior to the transmitting. In one aspect, the configuring comprises establishing a pricing for payment in exchange for access to the communication service. In another aspect, the configuring comprises establishing a group of peer mobile computing devices permitted to access the communication service. In yet another aspect, the establishing comprises determining a number of peer mobile computing devices included in the group of peer mobile computing devices or an identity of at least one of the group of peer mobile computing devices. In still another aspect, the configuring further comprises establishing, by the first mobile computing device, a quota of peer information available to at least one of the group of peer mobile computing devices that is provisioned for the communication service.

In other example embodiments, the disclosure can provide at least one processor-accessible storage device having programmed instructions for wireless communication that in response to execution, cause at least one processor to carry out any of the method described in the present specification and annexed drawings.

In one example embodiment, the disclosure provides a mobile computing device (also referred to as a mobile device). The mobile computing device can comprise a radio (or radio unit) configured to exchange information wirelessly with a peer mobile computing device, the radio having a communication processing unit and one or more antennas. In addition, the mobile computing device can comprise a cellular-sharing service unit configured to provision a communication service to the peer mobile computing device. Further, the mobile computing device can comprise a security controller (or security control unit) configured to supply information to an intended recipient device via a secure firmware communication pathway within the mobile device based at least in part on the intended recipient device. In one aspect, the security controller comprises a tamper resistant processor having one or more hardware security components.

In certain implementations, the intended recipient device comprises the peer mobile computing device, and wherein the security controller is configured to transmit at least the portion of the information to the peer mobile computing device via a first secure firmware communication pathway. In other implementations, the intended recipient device comprises a component of the mobile device, and wherein the security controller is configured to transmit at least the portion of the information to the component via a second secure firmware communication pathway. In one aspect, the security controller can be configured to receive second information according to a radio communication protocol via the second secure firmware communication pathway, wherein the security controller is further configured to transmit at least the portion of the information to the peer mobile device according to a second radio communication protocol.

In one scenario, the intended recipient device comprises the peer mobile computing device, and wherein the security controller is configured to supply advertisement content to the peer mobile computing device, the advertisement content is customized to an end-user associated with the peer mobile computing device.

In the example embodiment in which the mobile computing device is provided, in one implementation, the cellular-sharing service unit can be further configured to receive a connection request for access to the communication service from the peer mobile device. The connection request is received prior to the provisioning of the communication service. In addition, the cellular-sharing service unit is further configured to receive information indicative of a payment from the peer mobile computing device, wherein the payment is received in exchange for access to the communication service.

In other implementations, the cellular-sharing service unit is further configured to activate the communication service for the peer mobile computing device at a remote computing device, wherein the cellular-sharing service is further configured to transmit information indicative of an identity of the peer mobile computing device and payment mode for the peer mobile computing device to access the communication service. The payment mode can be one or more of direct payment mode or third-party payment mode.

In one scenario, the cellular-sharing service is further configured to initiate a communication session with the peer mobile computing device prior to transmission of at least the portion of the information to the peer mobile computing device via the first secure communication pathway. In one aspect, at least to initiate the communication session with the peer mobile device, the cellular-sharing service is further configured to establish a packet-switching protocol tunnel between the peer mobile computing device and a remote computing device associated with the mobile computing device. In another aspect, the cellular-sharing service is further configured to transmit session information indicative of the communication session to a remote computing device.

In the example embodiment in which the mobile computing device is provided, in certain implementations, the cellular-sharing service is further configured to configure the communication service prior to the transmitting. In one aspect, the cellular-sharing service is further configured to establish a pricing for payment in exchange for access to the communication service. In another aspect, the cellular-sharing service is further configured to establish a group of peer mobile computing devices permitted to access the communication service. In yet another aspect, the cellular-sharing service is further configured to determine a number of peer mobile computing devices included in the group of peer mobile computing devices or an identity of at least one of the group of peer mobile computing devices. In still another aspect, the cellular-sharing service is further configured to establish a quota of peer information available to at least one of the group of peer mobile computing devices that is provisioned for the communication service.

In certain example embodiments, the disclosure provides a computing device for wireless communication. The computing device can comprise at least one processor-accessible storage device having programmed instructions; and at least one processor configured to execute the programmed instructions and in response to execution of the programmed instructions, further configured to transmit service information indicative of a communication service provided by the computing device. In addition, in response to execution of the programmed instructions, the at least one processor is further configured to receive a connection request from a mobile computing device in response to the transmitting. In one implementation, in response to execution, the least one processor can be further configured to receive information indicative of a payment from the mobile computing device, wherein the payment is received in exchange for access to the communication service. Such payment information can be received within the connection request. Further, in response to execution of the programmed instructions, the at least one processor is further configured to determine if the connection request is valid. Such a determination can be performed by the first mobile device and, in one aspect, the determination can be effected at the first mobile device by applying access rules associated with or otherwise conveyed by a transactional model for access to the communication service or by receiving authorization information from a remote computing device. Further, in response to execution of the programmed instructions, the at least one processor is further configured to provision the communication service to the mobile computing device in response to ascertaining that the connection request is valid. Furthermore, in response to execution of the programmed instructions, the at least one processor is further configured to supply, in response to the provisioning, information via a secure firmware communication pathway within the computing device based at least in part on an intended recipient device for at least a portion of the information.

In certain implementations, the intended recipient device comprises the mobile computing device, and in response to execution, the least one processor is further configured to supply advertisement content to the mobile computing device, the advertisement content is customized to an end-user associated with the mobile computing device. The advertisement can be supplied within the information that is supplied in response to the provisioning.

In one scenario, in response to execution, the least one processor is further configured to activate the communication service for the mobile computing device at a remote computing device. In one aspect, the activation comprises transmission of information indicative of an identity of the mobile computing device and payment mode for the mobile computing device to access the communication service, the payment mode is one of direct payment or third-party payment.

In another scenario, the intended recipient device comprises the mobile computing device, and in response to execution, the least one processor is further configured to transmit at least the portion of the information to the mobile computing device via a first secure firmware communication pathway. In one aspect, in response to execution, the least one processor is further configured to initiate a communication session with the mobile computing device prior to transmission of at least the portion of the information to the mobile computing device via the first secure communication pathway. In another aspect, in response to execution, the least one processor is further configured to establish a packet-switching protocol tunnel between the mobile computing device and a remote computing device associated with the computing device. In yet another aspect, wherein in response to execution, the least one processor is further configured to transmit session information indicative of the communication session to a remote computing device.

In other scenarios, the intended recipient device comprises a component of the computing device, and in response to execution, the least one processor is further configured to transmit at least the portion of the information to the component via a second secure firmware communication pathway. In one aspect, in response to execution, the least one processor is further configured to receive second information according to a radio communication protocol via a second secure firmware communication pathway, wherein transmission of at least the portion of the information to the mobile computing device via the second secure firmware communication pathway comprises transmission of at least the portion of the information to the mobile device according to a second radio communication protocol.

In the provided computing device, in response to execution, the least one processor can be further configured to configure the communication service prior to the transmission of the service information. In one aspect, in response to execution, the least one processor is further configured to establish a pricing for payment in exchange for access to the communication service. In another aspect, in response to execution, the least one processor is further configured to establish a group of peer mobile computing devices permitted to access the communication service. In yet another aspect, in response to execution, the least one processor is further configured to determine a number of peer mobile computing devices included in the group of peer mobile computing devices or an identity of at least one of the group of peer mobile computing devices. In still another aspect, in response to execution, the least one processor is further configured to establish a quota of peer information available to at least one of the group of peer mobile computing devices that is provisioned for the communication service.

In other example embodiments, the disclosure provides an apparatus for wireless communication comprising means for performing any of the methods described in the present specification and annexed drawings.

In yet other example embodiments, the disclosure provide at least one processor-accessible storage device having programmed instructions for wireless communication that in response to execution, cause at least one processor to carry out any of the methods described in the present specification and annexed drawings.

In still other example embodiments, the disclosure provide at least one processor-accessible storage device having programmed instructions for wireless communication that in response to execution, cause at least one processor to operate a computing device (e.g., host device 210) in accordance with any of the functionality described in the present specification and annexed drawings.

Various advantages of the disclosure over conventional technologies for wireless communication service via an access point emerge from the present specification and annexed drawings. As an example advantage, certain embodiments can mitigate exposure of a host device to security threats by communicatively insulating, via specific secure firmware communication pathways, certain functional elements of the host device from information directed to a peer device. In addition, a peer device can be assured to have a secure and/or private connection to one or more network resources without the host device being operable to sniff a communication via such a connection and/or perform man-in-the-middle attacks by using an altered, malicious version of host functional element(s) (such as a malicious operating system (OS)). As another example advantage, one or more embodiments can permit nearly ubiquitous access to networked information substantially without geographical constraints.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture." "interface," "unit," "pipe," "module," "source," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface." "unit," "pipe," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide a communication network, such as a mobile communication network, in which a communication service can be provided to a mobile computing device from one or more other mobile computing devices. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A mobile device, comprising:
   a radio configured to exchange information wirelessly with a peer mobile computing device, the radio having a communication processing unit and one or more antennas;
a cellular-sharing service unit configured to:
provision a cellular-sharing connectivity communication service to the peer mobile computing device,
throttle a first amount of information received from the peer mobile device, based at least in part on a first quota, and
throttle a second amount of information transmitted to the peer mobile device, based at least in part on a second quota;
a security controller configured to send first information to an intended recipient device via a secure firmware communication pathway within the mobile device based at least in part on the intended recipient device; and
a component configured to receive a first portion of the first information from the security controller.

2. The mobile device of claim 1, wherein the security controller comprises a tamper resistant processor having one or more hardware security components.

3. The mobile device of claim 1, wherein the intended recipient device is the peer mobile computing device, and wherein the security controller is further configured to send a second portion of the first information to the peer mobile computing device via a first secure firmware communication pathway.

4. The mobile device of claim 1, wherein the security controller is further configured to transmit the first portion of the first information to the component via a second secure firmware communication pathway, wherein the second secure firmware communication pathway is communicatively insulated from the first secure firmware communication pathway.

5. The mobile device of claim 4, wherein the security controller is further configured to receive second information according to a first radio communication protocol via the second secure firmware communication pathway, and wherein the security controller is further configured to send the second portion of the first information to the peer mobile device according to a second radio communication protocol.

6. The mobile device of claim 1, wherein the intended recipient device comprises the peer mobile computing device, and wherein the security controller is configured to supply advertisement content to the peer mobile computing device, wherein the advertisement content is customized based at least in part on an end-user associated with the peer mobile computing device.

7. The mobile device of claim 1, wherein the cellular-sharing service unit is further configured to receive information indicative of a payment from the peer mobile computing device, wherein the payment is received in exchange for access to the cellular-sharing connectivity communication service.

8. The mobile device of claim 1, wherein the cellular-sharing service unit is further configured to activate the cellular-sharing connectivity communication service for the peer mobile computing device at a remote computing device, wherein the cellular-sharing service unit is further configured to send information indicative of an identity of the peer mobile computing device and payment mode for the peer mobile computing device to access the cellular-sharing connectivity communication service, wherein the payment mode is one of direct payment mode or third-party payment mode.

9. The mobile device of claim 3, wherein the cellular-sharing service unit is further configured to initiate a cellular-sharing connectivity communication session with the peer mobile computing device prior to transmission of at least the portion of the information to the peer mobile computing device via the first secure communication pathway.

10. The mobile device of claim 9, wherein the cellular-sharing service unit is further configured to establish a packet-switching protocol tunnel between the peer mobile computing device and a remote computing device associated with the mobile device.

11. The mobile device of claim 9, wherein the cellular-sharing service unit is further configured to send session information indicative of the cellular-sharing connectivity communication session to a remote computing device.

12. The mobile device of claim 2, wherein the cellular-sharing service unit is further configured to configure the cellular-sharing connectivity communication service prior to the security controller supplying information to the intended recipient.

13. The mobile device of claim 12, wherein the cellular-sharing service unit is further configured to establish a pricing for payment in exchange for access to the cellular-sharing connectivity communication service.

14. The mobile device of claim 12, wherein the cellular-sharing service unit is further configured to establish a group of peer mobile computing devices permitted to access the cellular-sharing connectivity communication service.

15. The mobile device of claim 14, wherein the cellular-sharing service unit is further configured to determine a number of peer mobile computing devices included in the group of peer mobile computing devices or an identity of at least one of the group of peer mobile computing devices.

16. The mobile device of claim 15, wherein the cellular-sharing service unit is further configured to establish a quota of peer information available to at least one of the group of peer mobile computing devices that is provisioned for the cellular-sharing connectivity communication service.

17. A method for wireless communication, comprising:
sending, by a first mobile computing device having at least one or more processors, service information indicative of a cellular-sharing connectivity communication service provided by the first mobile computing device;
receiving, by the first mobile computing device, a connection request from a second mobile computing device in response to sending the service information to the second mobile device;
determining if the connection request is valid;
provisioning, by the first mobile computing device, the cellular-sharing connectivity communication service to the second mobile computing device in response to ascertaining that the connection request is valid;
throttling a first amount of information received from the second mobile computing device, based at least in part on a first quota, and
throttling a second amount of information transmitted to the second mobile computing device, based at least in part on a second quota; and
sending, by the first mobile computing device in response to the provisioning, information via a secure firmware communication pathway within the first mobile computing device based at least in part on an intended recipient device for a portion of the information.

18. The method of claim 17, wherein the intended recipient device is the second mobile computing device, and wherein the portion of the information is sent to the second mobile computing device via a first secure firmware communication pathway.

19. The method of claim 17, wherein the intended recipient device is a component of the first mobile computing device, and wherein the portion of the information is sent to the component via a second secure firmware communication pathway, wherein the second secure firmware communication pathway is communicatively insulated from the first secure firmware communication pathway.

20. An apparatus for wireless communication, comprising:
a transmitter configured to transmit service information indicative of a cellular-sharing connectivity communication service provided by a first mobile computing device comprising the apparatus;
a receiver configured to receive a connection request from a second mobile computing device in response to transmitting the service information;
a provisioning component configured to determine if the connection request is valid;
a cellular-sharing service unit configured to:
provision the cellular-sharing connectivity communication service to the second mobile computing device in response to ascertaining that the connection request is valid,
throttle a first amount of information received from the second mobile computing device, based at least in part on a first quota, and
throttle a second amount of information transmitted to the second mobile computing device, based at least in part on a second quota; and
a security controller configured to send information via a secure firmware communication pathway within the first mobile computing device based at least in part on an intended recipient device for at least a portion of the information; and
a component configured to receive a first portion of the first information from the security controller.

21. The apparatus of claim 20, wherein the intended recipient device is the second mobile computing device, and wherein the security controller sends the portion of the information to the second mobile computing device via a first secure firmware communication pathway.

22. The apparatus of claim 20, wherein the intended recipient device is a component of the first mobile computing device, and wherein the security controller sends the portion of the information to the component via a second secure firmware communication pathway, wherein the second secure firmware communication pathway is communicatively insulated from the first secure firmware communication pathway.

23. At least one processor-accessible storage device having programmed instructions stored therein for wireless communication that in response to execution, cause at least one processor to perform operations comprising:
sending service information indicative of a cellular-sharing connectivity communication service provided by a first mobile computing device including the at least one processor;
receiving a connection request from a second mobile computing device in response to sending the service information;
determining if the connection request is valid;
provisioning the cellular-sharing connectivity communication service to the second mobile computing device in response to ascertaining that the connection request is valid;
throttling a first amount of information received from the second mobile computing device, based at least in part on a first quota, and
throttling a second amount of information transmitted to the second mobile computing device, based at least in part on a second quota; and
sending, in response to the provisioning, information via a secure firmware communication pathway within the first mobile computing device based at least in part on an intended recipient device for a portion of the information.

24. The at least one processor-accessible storage device of claim 23, wherein the intended recipient device is the second mobile computing device, and the secure firmware communication pathway is a first secure firmware communication pathway.

25. The at least one processor-accessible storage device of claim 23, wherein the intended recipient device is a component of the first mobile computing device, and the secure firmware communication pathway is a second secure firmware communication pathway, wherein the second secure firmware communication pathway is communicatively insulated from the first secure firmware communication pathway.

* * * * *